US008532372B2

(12) United States Patent
Youngman et al.

(10) Patent No.: US 8,532,372 B2
(45) Date of Patent: Sep. 10, 2013

(54) SYSTEM AND METHOD FOR MATCHING COLOR SWATCHES

(76) Inventors: Thomas Youngman, Rego Park, NY (US); Seth Forman, Huntington, NY (US)

( * ) Notice: Subject to any disclaimer, the term of this patent is extended or adjusted under 35 U.S.C. 154(b) by 204 days.

(21) Appl. No.: 13/199,080

(22) Filed: Aug. 17, 2011

(65) Prior Publication Data

US 2012/0045121 A1 Feb. 23, 2012

Related U.S. Application Data

(60) Provisional application No. 61/375,185, filed on Aug. 19, 2010, provisional application No. 61/499,556, filed on Jun. 21, 2011.

(51) Int. Cl.
*G06K 9/00* (2006.01)
*G06K 9/34* (2006.01)

(52) U.S. Cl.
USPC .......................................................... 382/162

(58) Field of Classification Search
USPC .................. 382/162, 164, 165, 167, 181, 190;
345/557, 589, 593, 597, 723, 765; 348/557,
348/560, 566, 582; 358/515, 517, 518;
101/483
See application file for complete search history.

(56) References Cited

U.S. PATENT DOCUMENTS

| 6,970,175 B2 * | 11/2005 | Hawksworth ................. 345/589 |
| 2002/0126328 A1 | 9/2002 | Lehmeier et al. |
| 2004/0078299 A1 | 4/2004 | Down-Logan et al. |
| 2004/0122553 A1 | 6/2004 | Phan et al. |
| 2006/0170996 A1 * | 8/2006 | Headley et al. ................. 358/518 |
| 2006/0195369 A1 | 8/2006 | Webb et al. |
| 2006/0215195 A1 | 9/2006 | Chan |
| 2007/0076013 A1 * | 4/2007 | Campbell et al. ............. 345/589 |
| 2008/0044081 A1 | 2/2008 | Lieb |
| 2008/0046409 A1 | 2/2008 | Lieb |
| 2008/0046410 A1 | 2/2008 | Lieb |
| 2008/0177640 A1 | 7/2008 | Gokturk et al. |
| 2008/0245861 A1 | 10/2008 | Fein et al. |

(Continued)

OTHER PUBLICATIONS

Hong et al., "An Intelligent Web Image Retrieval System," Proceedings of SPIE: Internet Multimedia Management Systems II, 2001, 10 pages.

(Continued)

*Primary Examiner* — Amir Alavi
(74) *Attorney, Agent, or Firm* — Ostrolenk Faber LLP

(57) ABSTRACT

A system and method are disclosed that includes storing, on one or more processor readable media that are operatively coupled to one or more processors, at least one database. The database(s) includes electronic color information representing a plurality of colors, and electronic item information representing a plurality of items. Each of the plurality of items respectively contain at least one of the plurality of colors. The database(s) also store electronic user information representing a plurality of users. First electronic color information is received from a first user computing device associated with a first user. The first electronic color information represents a first color. A search request is received from the first user computing device for one or more items that contain a color that is at least associated with the first color. At least one of the plurality of items that respectively contains the color that is at least associated with the first color is determined, and the at least one of the plurality of items and the first color are displayed.

24 Claims, 19 Drawing Sheets
(14 of 19 Drawing Sheet(s) Filed in Color)

(56) References Cited

U.S. PATENT DOCUMENTS

2008/0279481 A1 11/2008 Ando
2009/0112862 A1 4/2009 Mo
2009/0281925 A1 11/2009 Winter et al.
2010/0094872 A1 4/2010 Lehmuskallio et al.
2012/0045121 A1* 2/2012 Youngman et al. ............ 382/162

OTHER PUBLICATIONS

K. Greene, "Color Matching by Phone," Technology Review, Jul. 11, 2007, 3 pages.
Vasile et al., "Image Query Based on Color Harmony," Proceedings of the SPIE 4299-56, Jan. 2001, 12 pages.
http://appshopper.com/mac/developer-tools/colorsnapper, App Shopper: ColorSnapper (Developer Tools), May 8, 2011, 2 pages.
http://appshopper.com/reference/mypantone, App Shopper: myPANTONE (Reference), Sep. 11, 2009, 4 pages.
http://appshopper.com/lifestyle/ben-color-capture, App Shopper: Color Capture (Lifestyle), Jun. 8, 2009, 3 pages.
http://appshopper.com/utilities/colorsnap, App Shopper: ColorSnap (Utilities), May 22, 2009, 3 pages.
http://itunes.apple.com/us/app/mypantone/id329515634?mt=8, myPANTONE for iPhone, iPod touch, and iPad on the iTunes App Store, Jul. 11, 2011, 8 pages.
http://itunes.apple.com/us/app/colorsnap/id316256242?mt=8, ColorSnap for iPhone, iPod touch, and iPad on the iTunes App Store, Feb. 11, 2011, 7 pages.
http://itunes.apple.com/us/app/color-capture/id318034543?mt=8, Color Capture for iPhone, iPod touch, and iPad on the iTunes App Store, Jul. 7, 2011, 7 pages.
International Search Report and Written Opinion dated Dec. 22, 2011 in corresponding International Application No. PCT/US2011/48292.

* cited by examiner

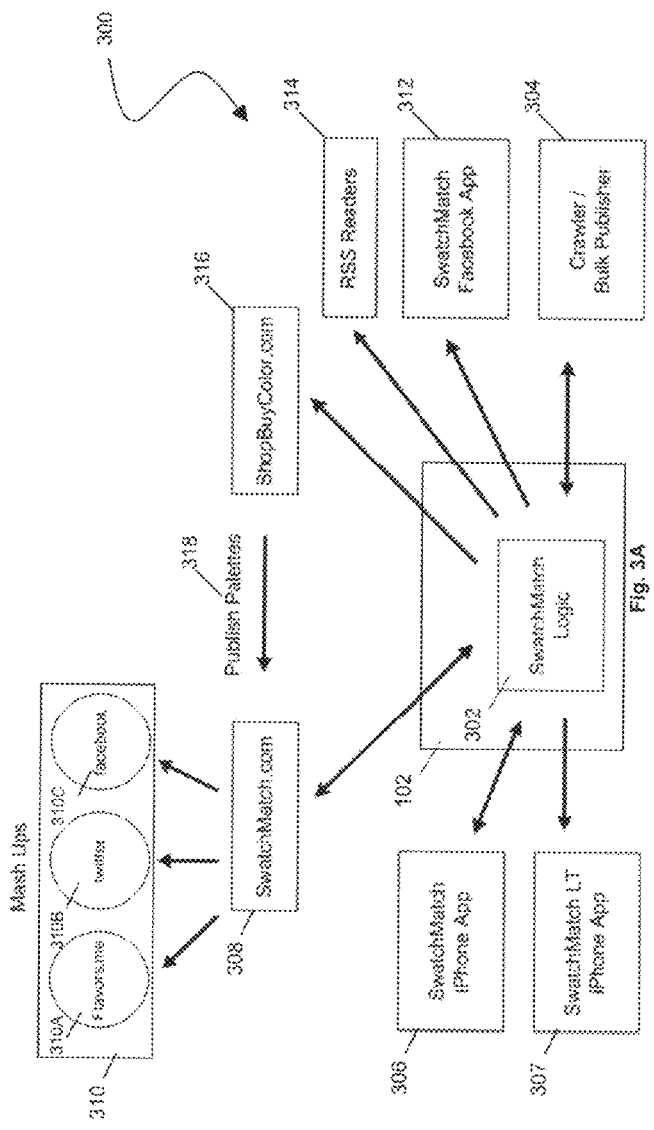
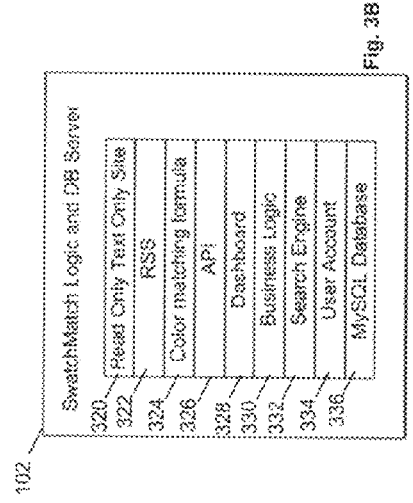

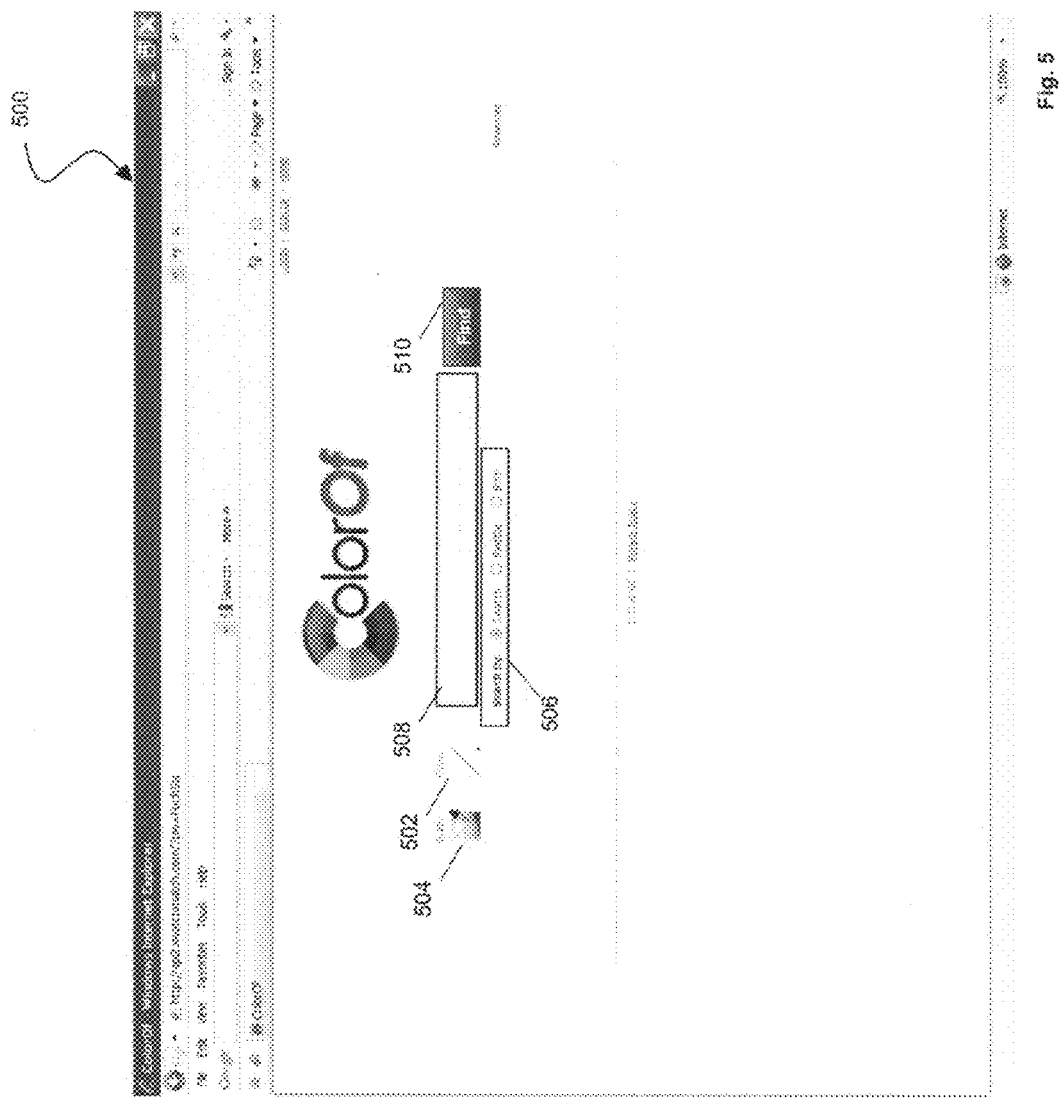

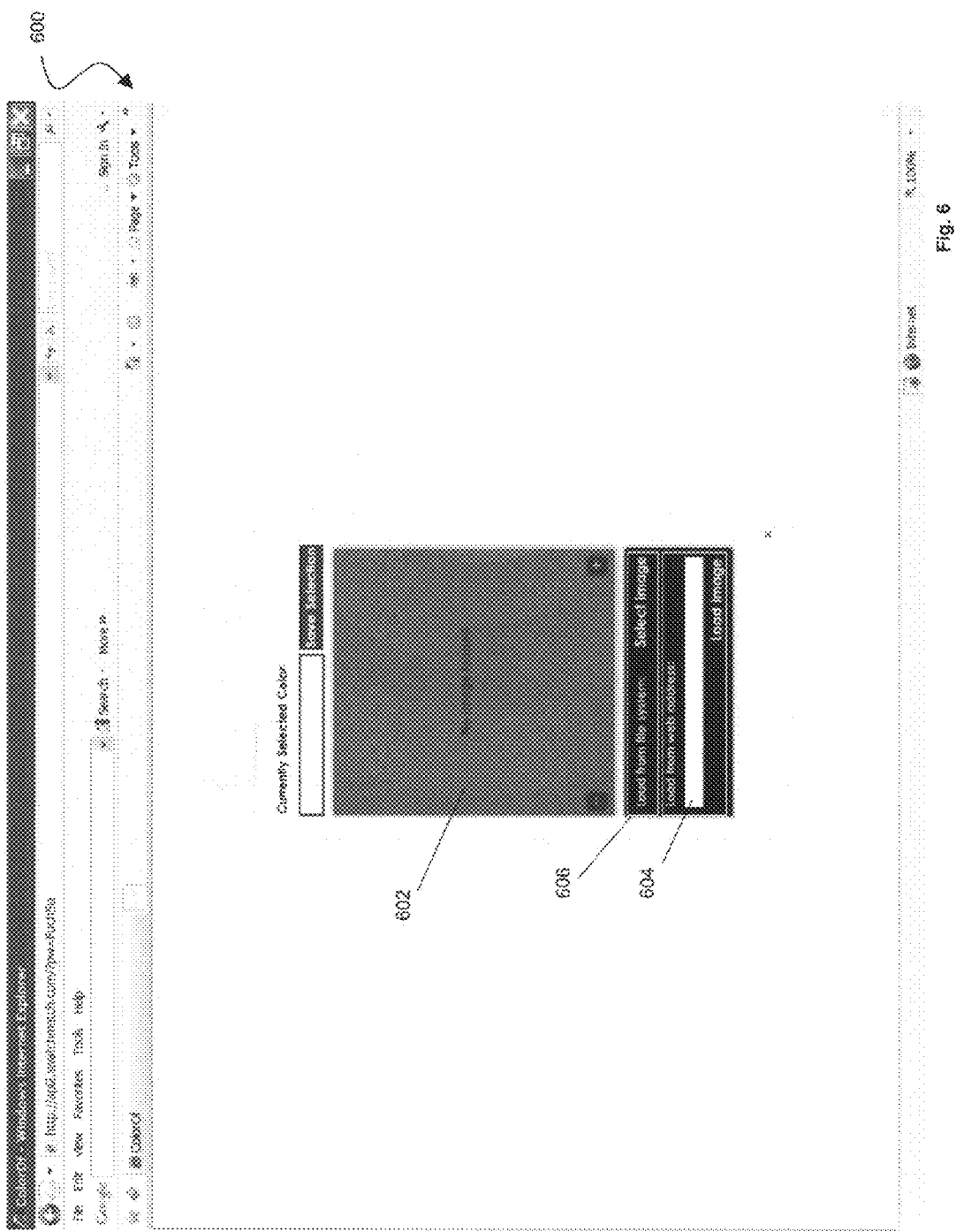

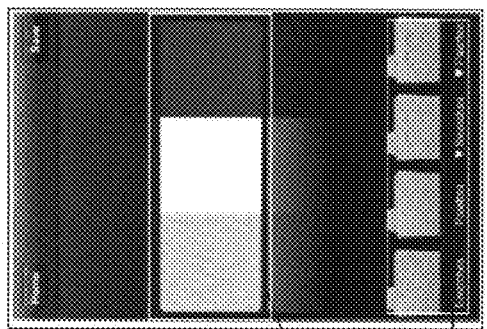
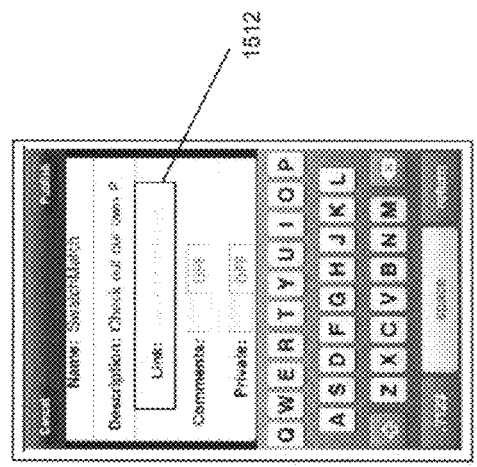
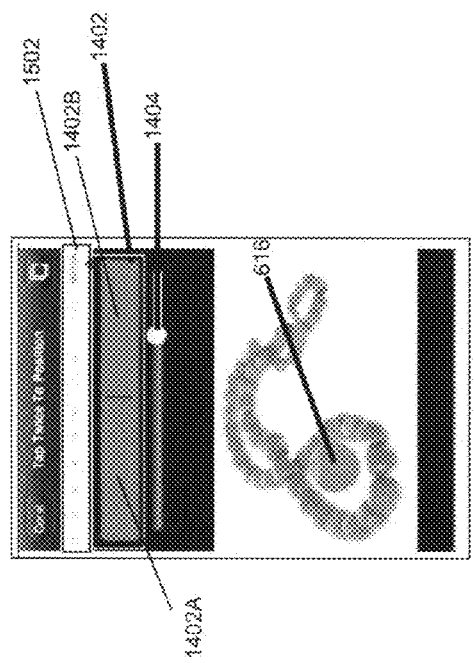
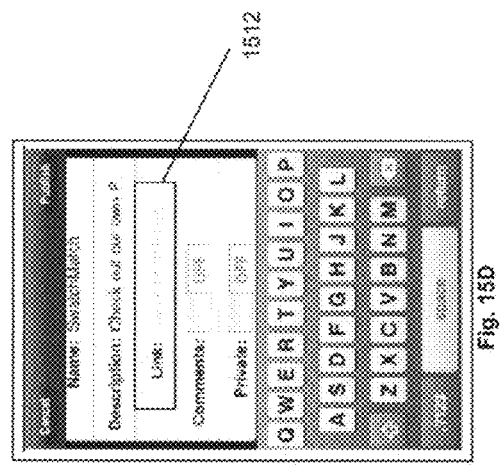

SYSTEM AND METHOD FOR MATCHING COLOR SWATCHES

RELATED APPLICATION

This application is based on and claims priority to U.S. Provisional Patent Application Ser. No. 61/375,185, filed on Aug. 19, 2010 and entitled "SYSTEM AND METHOD FOR MATCHING COLOR SWATCHING" and U.S. Provisional Patent Application Ser. No. 61/499,556, filed on Jun. 21, 2011, and entitled "SYSTEM AND METHOD FOR MATCHING ELECTRONIC COLOR SWATCHES," the entire contents of both of which are hereby incorporated by reference.

BACKGROUND

1. Field

The present invention relates generally to communications and, more particularly, to product color matching, coordination and search over a communication network.

2. Description of the Related Art

In the marketplace today there are several types of color schemes, as well as color matching systems or standards targeted towards different markets. With the exception of some paint color matching systems, these products or services are predominantly paid for and provided for corporate customers to reproduce color consistently in manufacturing or print. It is recognized by the inventors that an item's color is one of the most important buying criteria when a consumer buys almost anything, and the marketplace lacks a way for consumers effectively and efficiently to match, coordinate and search for items by color. Part of the reason for this shortcoming may be that item color or colors are not indexed and published in accordance with an agreed upon standard. Moreover, providing a standard without a corresponding content for appropriate searching, such as via indexing, would not be suitable.

SUMMARY

A ubiquitous color matching and/or coordinating system and method is provided herein that is developed to assist consumers with color-based buying decisions. In an embodiment, the color matching and coordinating system and method are tied to one or more web services or collection of web services. The web services preferably provide many features, including a social network community associated with color, color matching, and color coordination, as well as to publish and/or subscribe to color feeds, and to search by color within a user defined range, with or without keywords or tags. Moreover, an interface may be provided for an automated system to operate on or against color, and that provides an ability for retailers to publish their products on-line to make products searchable by color, with an enhanced ability to control color on other web services.

In an embodiment, a system and method are disclosed that includes storing, on one or more processor readable media that are operatively coupled to one or more processors, at least one database. The database(s) includes electronic color information representing a plurality of colors, and electronic item information representing a plurality of items. Each of the plurality of items respectively contain at least one of the plurality of colors. The database(s) also store electronic user information representing a plurality of users. First electronic color information is received from a first user computing device associated with a first user. The first electronic color information represents a first color. A search request is received from the first user computing device for one or more items that contain a color that is at least associated with the first color. At least one of the plurality of items that respectively contains the color that is at least associated with the first color is determined, and the at least one of the plurality of items and the first color are displayed.

Other features and advantages of the present invention will become apparent from the following description of the invention.

Features and advantages of the present application will become apparent from the following description of the invention that refers to the accompanying drawings.

BRIEF DESCRIPTION OF THE DRAWINGS

The patent application contains at least one drawing executed in color. Copies of this patent or patent application publication with color drawing(s) will be provided by the Office upon request and payment of the necessary fee.

For the purpose of illustrating the invention, there is shown in the drawings several forms which are presently preferred, it being understood, however, that the invention is not limited to the precise arrangements and instrumentalities shown. The features and advantages of the present invention will become apparent from the following description of the invention that refers to the accompanying drawings, in which:

FIG. 3A is a block diagram illustrating flow of information and interactivity between various resources and processes in accordance with an embodiment;

FIG. 3B is a block diagram that illustrates logic and database resources accessible to an information processor in accordance with an embodiment;

FIGS. 5-13 illustrate an example web-based embodiment, including API publisher, in which a user identifies a particular swatch, palette or both and searches for corresponding items;

FIGS. 14-16 illustrate an example embodiment in accordance with a mobile application, including API publisher, in which a user identifies a particular swatch, palette or both and searches for corresponding items.

DESCRIPTION OF EMBODIMENTS

Figure 1:
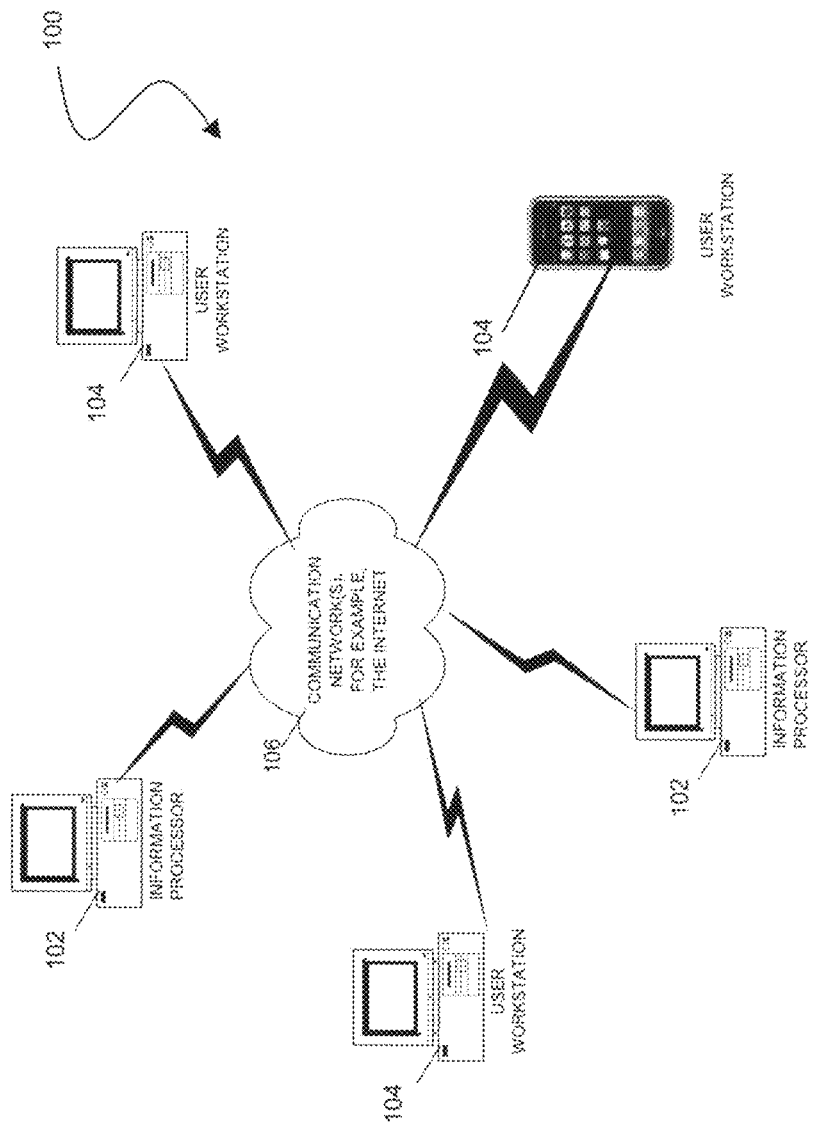
FIG. 1 illustrates an example hardware arrangement in accordance with an embodiment of the present application.

A system and method are disclosed for providing color matching or coordinating for items being the same or containing the same color as set forth in a user-specified color or user-specified item. In an embodiment, the user uses one or more software applications to capture and store one or more numerical representations of color on a computer, smart phone or other mobile computing device, or on a server accessible over the Internet, and that matches the color on the same device or on a community website. Preferably, a networked community is provided and available via one or more web services. Users and/or automated systems conduct searches for items that match one or more particular colors that may be captured or otherwise identified. The color(s) may be matched exactly or may be within a user specified range. Moreover, users can search for colors that the networked community determines are well coordinated with, or are complementary to a respective color.

The user-defined numerical representation of color is preferably stored as an electronic swatch or swatch, which may be assigned various attributes or metadata so that it can be indexed by a computer system. As used herein, a color refers, generally, to a single color that may be provided in one or more numerical representations that may also be assigned one or more identifiers, such as a name and/or user-defined rating. In an embodiment, a user-defined numerical representation of color is stored at least temporarily, such as in RAM or other memory. Also as used herein, a swatch represents a color or collection of colors from a single source. A source may be, for example, an image of a product or good as represented in an image provided on one or more interne websites. Alternatively, a source may be a physical sample or other colored representation. A swatch may have one or more attributes that include, for example, names of underlying color(s), names, descriptions, tags, hyperlinks to origins of source, origin site identifiers and/or sources of color distribution. A palette refers, generally, to a collection of colors that are provided from different sources. A palette has attributes which may be inherited from underlying attributes of a swatch or a collection of swatches from one or more of the sources of the palette. Examples of attributes of a palette include, for example, underlying colors, descriptions, tags, palette types, whether a palette is publicly or privately available, hyperlinks to origins of respective colors and inherited attributes, such as from one or more swatches. Moreover the term, groups, as used herein, refers to a collection of swatches and/or palettes that have attributes that may include underlying swatches or palettes including names, and also inherited attributes from one or more of the swatches or palettes. Users, businesses and/or automated systems are provided with tools to group swatches together into electronic palettes in various ways, and the palettes may be published to the community.

Electronic palettes are preferably assigned a predefined or user-created "palette type" that allow users and/or automated systems using the community to understand why particular colors are grouped together in one or more palettes. In an embodiment, users and/or automated systems may publish a palette type, which may be searched for, for example, to locate a particular palette type. For example, a user publishes a palette with the type, "purposely mismatched." Continuing with this example, another user searches for purposely mismatched palettes and uncovers the first user's palette. In an embodiment, a selectable drop-down list of palette types is provided in a search interface, and options provided in the drop-down list are added each time a user defines a new palette type. In addition to a palette type, other attributes may be assigned to a palette so that the palette may be indexed by a computer system. Moreover, users may group a plurality of swatches and/or palettes into groups. The groups may further inherit underlying attributes of the respective swatches and/or palettes contained within the group.

In accordance with an example embodiment, an indexing system and method are provided that examine internet websites for content that is appropriate for the standard in accordance with the teachings herein. For example, a web crawler indexes websites and may publish as a function of content that corresponds to the teachings herein. In this way, content can be searched for by users as a function of color.

Also as used herein, colors may be single numerical representations on a computer system that can be assigned to a user defined name. In this way, users may create their own color names without being required to learn and/or memorize color names. A color within the system may, therefore, have multiple names. A common or highly recommended (as defined by an on-line community described in greater detail below) name for each color may be stored in a dynamic color name database ("DCNDB"). If an unnamed color is displayed within the system, its other DCNDB name may also be displayed. If a name for the color has not yet been assigned in the DCNDB, the numerical representation of the color may be shown. If a user or business has assigned a name to a color as part of a swatch or palette, the user's assigned name may also be shown. Users or businesses may also publish their own color name database, which is accessible. Users may then choose which database to use for a default color naming system. If a user clicks on a color, (s)he will be presented a list of names that the color is known by within the system. To publish a color and optionally a name, a user or business preferably publishes a swatch, palette or a color name database to the system that contains that color. Thus, various name options are supported herein.

Preferably, swatches are configured with underlying attributes. For example attributes for an article of clothing may include the cut, sheen, pattern, material, or the like. For paint, attributes may include oil or latex base, sheen, interior or exterior. In an embodiment, attributes can be included in the product description or as tags assigned to the swatch. The attributes may be provided by a user via a user interface, or may be provided in some automated fashion by a system that indexes product websites. All underlying swatch attributes may also be inherited (as known in the art) by any palette in which they are grouped together. A combination of the numerical representation of color, swatches, palettes, predefined type(s) and their attributes presented via a web service creates a new standard by which users and/or automated systems can match, coordinate, search for and/or shop by color.

In an embodiment, an Internet web service standard is provided and described through a documented application program interface (API), which can be read from and used as or in connection with a color search engine. With an account on the web service, the API may also be published to, allowing users, business and/or automated systems to make new content, products or services searchable by color. Preferably, a hyperlink or uniform resource locator (URL) is assigned by a user or automated system to a respective swatch or palette that has been published. Moreover, the swatch or palette may be configured with an attribute that allows users or automated system to direct other users to their own website. Users, businesses and/or automated systems can enable the features described herein on their own websites by utilizing code provided in connection with the teachings herein to connect to the web service.

Thus, the present application may provide a standard by which users, businesses and/or automated systems can store and assign attributes or metadata to color through a web service that can be operated on by other users or automated systems. The present application also allows users, businesses and/or automated systems to match color, to coordinate color, to search for items or images that contain a color or multiple colors within a user-defined range.

The present application further allows users, businesses and/or automated systems to filter out or otherwise apply effects of a light source on a respective color of an object or item. The present application also allows users, businesses and/or automated systems to publish recommended coordinating color palettes to a community on the web service.

Further, the present application allows businesses and/or automated systems to publish the color in which items offered for sale are available in to a community on the web service. Users and/or businesses also use the teachings herein to publish one or more custom light filter(s) to a community on the web service. The present application allows users to promote or highlight their published content. The present application allows users and/or businesses to leverage on their own websites the features of the present application, such as with code provided by the present application and access to the web service.

The features described herein are provided via the following general categories: Swatch Creation; Swatch Matching; Palette Creation; Publishing Palettes; Custom Web Crawler; Swatch and Palette Search Functionality; Business Logic; Advertising and Revenue Generation; Community Site; Swatch Color Naming Functionality; Groups and Ensembles Definition; Light Effect Navigation; and various additional features. Moreover, products and services are provided herein.

Swatch Creation

A user of the present application captures color from an image or photo that is stored or otherwise captured via a smart phone or other mobile computing devices. The user may select options to convert the image to one or more numerical representations, and thereafter to store temporarily or permanently, or immediately operate with the numerical representation(s) of a color as an electronic swatch or swatch(es). As noted above, a user may name a color or colors that make up their swatch as they see fit. Preferably, the numerical representation of color is standardized as one or more hexadecimal value, which are understood by computer application systems as a way to represent color.

In an embodiment, an application is provided for capturing several colors and to list out those colors. The user may remove any color(s) from the selection and optionally average the numerical representation of color to create a swatch of a single color.

Users may use a camera, such as provided on a smart phone or other mobile computing device, to take a photo and then immediately use it to create a swatch or capture an individual color, as described herein. In an alternative embodiment, users of a web browser software application may capture color from an image, photograph on the internet or on a local server, and then upload the image to the server or directs the server to the image on another server also hosted on the internet, for example, via a URL to capture and store temporarily or permanently, or immediately operate with the numerical representation of the color as an electronic swatch.

Further, a user of a computer, smart phone, and other mobile computing devices, or who accesses a server hosted on the Internet, is provided with the ability to choose a color to be stored as an electronic swatch via a touch screen, mouse or other pointing device. The user of a computer, smart phone, and other mobile computing devices may also be provided with the ability to perform other image related functions, such as to zoom in, zoom out or move an image or photograph so a user can more accurately choose the color to capture from the image or photograph.

Also, users may enter a numerical representation of a color directly or via a color chart, wheel or list of colors to get a numerical representation of color and store it temporarily or permanently, or immediately operate with it as a swatch. Further, the color represented numerically may be displayed as a swatch icon in that color and displayed on computer display system. One skilled in the art will recognize that computer display systems may represent the same color differently on disparate systems. Thus, displays are preferably not relied upon for matching color, but only to interface with humans. Instead, numeric representations are used.

The teachings herein also provide for swatch and palette management. A user or automated system defines a hierarchical folder system, which allows users to organize and store electronic swatches. Users navigate through the hierarchical folder system in order to select a previously saved swatch and operate with it, substantially as described herein.

Attributes and/or metadata are assigned in standardized fields, and applied to numerical representations of color or electronic swatches. The attributes/metadata name the color, describe the subject in the image from where the color was taken, categorize, tag, assign keywords, and/or the GPS location of where the electronic swatch was created or is available.

Further, a link or URL may be assigned to a swatch in a standardized data entry field and that may bring other users to the user's (or one or more businesses') website or any other website available on the internet that a user or business may want to direct to. In this way, the user may purchase or find information about an item from which the swatch was created, or view an image from which the swatch was created.

In order to create a subject icon or image from the image or photo, grain contents of an image may be captured around the area from which the color is captured so as to provide a means for the users to identify where the color was taken from.

Swatch Matching

Color is preferably matched by comparing, programmatically, numerical representations of two colors on a computer, smart phone, and other mobile computing devices or on a server hosted on the Internet. The two numerical representations of color that are being compared may come from any combination of an electronic swatch, image or photo including, but not limited to, comparing a previously stored electronic swatch to a color in an image or photo through the method as described above.

The closeness in color of the two numerical representations of color is displayed to the user by means of a meter. The meter may represent the closeness in color in a number of ways such as, but not limited to, an arrow that moves from left to right as user through the method described above selects a color in a photo or image. The meter may also use a color scale to represent to the user the closeness of the two colors.

Palette Creation

In an embodiment, users, businesses and/or automated systems may group colors that may come from electronic swatches together into electronic palettes for any number of reasons, including but not limited to groups of colors believed to go well together, are well coordinated, are complementary, make a good series, are hues, tints or shades of one another.

In an embodiment, users capture a plurality of colors and list out the colors. A user can remove any color from the list and then save all remaining colors in a single palette. Users, businesses and/or automated systems may further group colors or colors from electronic swatches together into electronic palettes for items that go well together and/or that are for sale or available in those colors.

Users, businesses and/or automated systems may also group colors or colors from electronic swatches together into electronic palettes for any item that has those colors in components of an over color scheme or pattern of the item. Moreover, users, businesses and/or automated systems may assign a separate hyperlink or URL for each color in a palette. The link may be to a swatch that is available or otherwise found in the service that was the original source of the color. Alternatively, the link may to an external website where the color can be found, but not limited to a product available on that website. As used herein, a swatch is a collection of colors from a single source, such as an image file. Preferably, only one hyperlink is allowed for each respective swatch. Palettes, on the other hand, are collections of colors from multiple sources, so a user or automated system may assign a link for each color published as part of a palette. The link may be to the color on or to the originating web site. If a user uses a color from a swatch they found in the community as part of a palette ideally they (or the application) links back to that swatch in the community, so as to acknowledge the origin of that color. This link also allows the application to make a connection between the color in a palette and the swatch it came from so that palette can inherit the attributes of the swatch as well.

In an embodiment, users define one or more reasons why colors or colors from electronic swatches were grouped together into electronic palettes as described above using a predefined list or a user created 'palette type'. Predefined palette types may include, for example, "Available In," "Complementary," "Components of," "Coordinating," "Purposely Mismatched," "Series," "Hues," "Shades," "Tints" and Other, which allows users to define their own palette type.

In an embodiment, palettes inherit underlying attributes or metadata of the respective electronic swatches for the colors that make up the palette.

Attributes or metadata are stored in standardized fields to an electronic palette that categorize, tag, assign keywords, description, and item description. Other users can comment or not comment on the palette and a palette may or may not be made available for view by other users.

Further, a link or URL can be assigned to a palette in a standardized data field that may bring other users to the user's, or one or more businesses' website or any website available on the internet that a user or business may want to direct to for any number of reasons, including but not limited to: for the user to purchase or find information about an item from which the palette was created, or view an image from which the palette was created.

Further, users or an automated system may define a hierarchical folder system to organize and store electronic swatches or palettes. Users or an automated system may navigate through a respective hierarchical folder system in order to select a previously saved palette and/or operate with it as described herein. Users or an automated system may further create a 'Search Palette', which may contain multiple swatch colors that may be found in one or more other swatches or palettes.

In an embodiment, users, business or automated systems may create a swatch or palette with a single swatch color, thereby allowing them to assign swatch or palette attributes to a single color. Further, users or an automated system may choose any color contained within a swatch or palette published, by them or another user, and operate with it as any other swatch as described herein.

Publishing Swatches or Palettes

In an embodiment, a combination of numerical representations of color(s), swatches, palettes, and attributes or metadata, such as described above, become a standard by which users, businesses and/or automated systems can publish to, match and coordinate color. In an embodiment, registered user accounts are required in order for users to publish to the web service, so as to enable tracking of who has published content, and to track the content. Further, content published by users may be grouped and indexed by respective user accounts so that users, business or automated systems can search for content by user account.

In an embodiment, the present application provides an open standard that is searchable and/or readable and available on the internet via a web service that includes an application program interface (API), website or websites, and database hosted on servers reachable via the internet. Businesses may be segregated from general users, such that published content that promotes business account (e.g., 'designer status' or designers), provides additional features and to separate designer published content from the masses.

In an embodiment, users or designers organize their palettes into a user navigate-able hierarchy, referred to herein, generally, as "bread crumbs."

Users and business may create their own page(s) that are available on the web service and may describe themselves or their business and reachable at a vanity URL based on a respective account name. or example www.the present application.com/designer where a designer is the account name. Users and business may thereby promote, market or advertise their vanity URL.

In an embodiment, users, businesses and/or automated systems may allow or not allow user comments on their palettes within the web service. Users, businesses and/or automated systems may publish color palettes, swatches and attributes or metadata, via the API web service, in accordance with the teachings herein. Users, businesses and/or automated systems may publish to the web service their color palettes, swatches and attributes or metadata. Further, users, businesses and/or automated systems may edit or delete their published palette(s) directly on the web service through a browser. Users, businesses and/or automated systems may publish color, swatch or palettes via a client software application to the web service.

In an embodiment, users, businesses and/or automated systems may create or write their own client software application in order to publish to the web service based on a standard and/or documentation of the API provided herein. In this way, users, businesses and/or automated systems may publish content in bulk, such as via a comma-separated values (csv) file to the web service from an application hosted on the Internet. Users, businesses and/or automated systems may use an automated system to search for their published content that contain the attributes or type they want to delete and then store content into delete files in csv format with a flag delete column. Moreover, users, businesses and/or automated systems may use the system described in the bulk publishing section above to apply the delete file in order to perform a bulk delete of their content.

Custom Web Crawler

In an embodiment, an automated system, application or crawler is provided to index images on the internet in order to collect the information or data required to publish to the standard, which may automatically populate the web service.

In an embodiment, an automated system indexes a website and may prompt an operator for information such as for the meaning of the website's html layout as it relates to the standard, including the images, font size or style, bread crumb information, table or cell format and other html code attributes. The automated system preferably collects data from the website and applies its understanding of the website layout. The automated system further may store the data it has collected and then publish the data to the web service.

In an embodiment, an automated system indexes content of interest or product pages within the website. An operator, such as one who is skilled in the task of simple script writing or coding, preferably reviews the website layout to ensure compliance with the standard, including the images, font size or style, bread crumb information, table or cell format and other html code attributes. A script may be written specific for the website layout to drive an application testing program to gather content needed to publish to the standard. Moreover, an indexing system may locate the content of interest, and direct the application testing program to each page of the website where content should be gathered. Operators can further use a suitable application to select content needed to publish to the standard, so as to automatically create a script specific for that website layout. Content for publishing to the standard may be assembled by code on the client (or browser side) of the application. For some websites it may be appropriate to gather content in a non-traditional manner, such as through a web application testing system. The site specific code described within can be used to drive or play back in a browser the collection of content through use of the web application testing system. Such a system, however, may not scale well due to a desirability to operate the application on a computing device that includes a monitor. Using headless frame buffer operated in memory, as opposed to displayed on a monitor, the application can be ported to virtually any computing resource. Once the operator has produced the site specific code, that code can be reused to crawl the site periodically.

Swatch and Palette Search Functionality

In an embodiment, various data, including numerical representation of color, attributes, metadata, tags, keywords, brand name, swatches and palettes, are made searchable by storing all such data into a database. The numerical representation of color is made searchable within a user defined range or accuracy by allowing the user to select the closeness in the numerical representation of color they are looking to match to another numerical representation of color. The numerical representation of color may be made searchable within a user defined range or accuracy thereby allowing the user to select the closeness in the numerical representation of color they are looking to match within a 'search palette'. Users may select the number of color matches they want against a 'search palette' when searching for other palettes. For example match all, 3 out of 5, 4 out of 5, or the like.

Users may further utilize a slider to determine the closeness in the numerical representation of color they are looking for. Moreover, users may select a palette type from a list of predefined palette types or to use their own palette type when searching the database. Users may further select tags, keywords or attributes or metadata when searching the database. Users may further use any combination of numerical representation of color, a range, palette type, attributes or metadata when searching the database in order to broaden or narrow their search criteria when searching the database. Accordingly, users, business or automated systems may conduct searches as described herein with or without user defined accuracy with any client that interfaces to a predetermined standard through the web service and/or the API.

In an embodiment, users, business or automated systems may leverage a web site or software application mashup (as known in the art) any of the data available on the web service, provided users comply with the terms and conditions set forth and made available on the web service. Modular search formulas may be provided for color matching that can be published by and chosen by users, businesses and/or automated systems.

Business Logic

In an embodiment, user-based searches for data, as described herein, are provided in a particular order as determined by predefined business logic.

Further, the present application includes business logic in order to provide a viable business whereby users, businesses and/or automated systems are charged a fee to promote or highlight their content within the web service. IP addresses of users may be monitored to ensure compliance with the terms of service. In an embodiment, the present application creates a color, swatch, palette and item ranking system as part of the application business logic. The ranking system is used to determine top or most popular colors, swatches and/or palettes in the web service and to display them on the community site in a ranked order. Terms and conditions set forth for use of the web service protect the integrity of the order in which data is returned and mandate that external users, or websites that use the data display the data in same order in which it is presented to them.

Users and/or businesses may be charged a fee to utilize the present application business logic, and to promote or highlight colors, swatches and/or palettes or items within the web service and search results using a paid per click and/or paid per tap scheme. Users and/or businesses may be charged to utilize the present application and associated business logic, and to access user information (e.g., gender, favorite colors) on their own website. For example, users may be charged a monthly fee and/or through an affiliate program to use the present application business logic as described above. Further, an "Ad Extension Network" may be provided whereby network members (content sites) receive a portion of the paid per click or paid per tap revenue. Network members could be color sites, fashion sites, blogs, etc., and that are looking to monetize their content.

Users who choose whether they want their paid-for-promotional swatches or palettes and items to be displayed on the Ad Extension Network may choose specific types of sites by content site. Further, users, businesses and/or automated systems and network members may link back to a particular or their own swatch or palette on the present application's services, which may increase page rank in other search engines. For example, if a business, user and/or website linked to a particular swatch for a green and white tie for St. Patrick's day, GOGGLE may interpret it as relevant and put it near the top of search results for a search for a green and white tie. Users, businesses and/or automated systems are encouraged to link back to their swatches or palettes, as doing so increase ranking, such as in various search engines.

Advertising and Revenue Generation

In an embodiment, users and business are provided with an option to pay to be featured in a special section of the application, such as for featured swatches or palettes on a monthly basis. For example, users, businesses and/or automated systems may be offered the ability to pay for a spot (advertisement) in the designer section of the application for a premium designer section on a yearly basis. Users, businesses and/or automated systems may further be offered an ability to pay for banner advertisements in strategic areas throughout the web service. Collectively these may include mobile applications, websites, and web properties on the advertisement extension network. Moreover, users and/or businesses may be offered an opportunity to pay for swatches or palettes to be displayed first when a user, or automated system searches for a particular numerical representation of color, keyword or tags. Moreover, users and/or businesses may be offered an ability to pay for an advertisement on the web service based on keyword, tags or the numerical representation of color. Users and/or businesses may elect to pay for an advertisement only when it is clicked or tapped on by a user. In an embodiment, an item landing page is provided for businesses that don't sell items directly to consumers, such as manufactures or designers.

Landing pages may aggregate retailer sites that sell the item on one page. Further, an affiliate marketing website (e.g., "ShopBuyColor.com") may be provided for a business to participate by giving a portion of the revenue generated through sale of an item that was found on an affiliate marketing website. Data or contributions made on a community website may be leveraged to enhance features, including for coordinating color recommendations and to add content to the affiliate marketing website. Affiliate marketing participants may further be displayed at the top of or otherwise be featured on the website. Further, data about the popularity and use of color may be collected and then sold through a Color Market Analysis and Trending services.

Community Site

In an embodiment, a community website may be provided that is dedicated to the matching and coordinating of colors, and where users can make suggestions about matching colors, publish articles, blog, post comments, rate colors and color combinations, publish their swatch and palettes, mash up their content with other web services.

Community members may flag other community members as friends within the community and through the service send an instance message to their friends asking if a color or item represented by a swatch would look good on them.

Further, ads, feature palettes, premium palettes and affiliate marketing participants may be displayed on the community website to generate revenue.

Swatch Color Naming Functionality

Users and/or businesses may be provided with one or more tools to choose a swatch color name from a name suggestion database. In one embodiment, users, businesses fill in the Color Name attribute based on color name suggestion database or to type in their own color name. Users and business may publish their own color name suggestion database via the API. Color names may be displayed in the database for every color on the website in a hierarchical fashion, in which users can drill down into, starting broad, for example black, and drilling down. Once a user drills down into a particular discrete color, names for that color are displayed and the top palettes that contain that color. The most popular names for each discrete color may be published within the community and to display the color name popularity in a tag cloud. Users, businesses and/or automated systems may query all the color name suggestions databases for a particular swatch.

Groups and Ensembles Definition

The present application enables users, businesses and/or automated systems to create groups of swatches or palettes and arrange them by different category across all business accounts. For example, a group named, "Something Blue" is created which has nothing but blue (which has a large color range) items for women. Providing groups makes it easier for users to find commonly searched-for items. Moreover, this group page will rank high in the search engines for something blue. Group pages may be assigned to vanity URLs, such as on the "Shop Buy Color" web site, for example ShopBuyColor.com/SomethingBlue. Further, online ensemble tools and/or web pages may be provided so users can buy products from different retailers to create an outfit or look in which the colors work well together.

In an embodiment, an online ensemble tool may be provided that includes rotating wheels, such as provided with in a slot machine, in which the user picks a top, then a bottom, then shoes, or the like. In an embodiment, the tool recommends items that work well together. Ensemble tools may be displayed for items based on a user-defined palette which they found in the community. Consumers may use a mobile ensemble tool application or ensemble physical coupon that allows them to shop at a mall across participating retailers for an outfit. Moreover, consumers may capture a numerical representation of color of an item that they just purchased, and may receive recommendation from the ensemble tool of items they can purchase that will work well with the item they just purchased.

Light Effect Negation

In an embodiment, users may create a 'Light Mask' which is a special electronic swatch where by the numerical representation of a known white object taken from an image or photo is subtracted from the numerical representation of pure white (hex FFFFFF) and the numerical difference is stored as an Light Mask Swatch. The Light Mask Swatch may be added to or subtracted from another Swatch to add or remove the effect of a light source on a Swatch. Further, the present application may publish Light Mask Swatches for commonly known light sources, such as florescent light, sun light, flash from a camera light. Users, businesses and/or automated systems may also publish Light Mask Swatches, as described herein.

In an embodiment, users, businesses and/or automated systems create bar codes for Light Mask Swatches as described herein, and affix the bar code to mirrors in their dressing room so users can filter out the effects of the dressing room light. A Light Mask may then be applied on a smart phone or other mobile computing device to an entire photo or image and display that photo or image back to the user and/or allow them to save the photo or image.

Additional Features

In addition to the features set forth above, users, businesses and/or automated systems may associate palette(s) with a respective bar code that can be displayed in a store or item tags. This allows users to quickly save the swatch or palette as a favorite swatch or palette. Further, users may use a client software application to grab the bar code with a camera on a smart phone or Other mobile computing device, and quickly save it to their favorites, for example, for future use. Users may save any swatch or palette in a special section of the App, for example, called "Favorites." Users may further organize their "favorites" into a respective hierarchical based folder system.

In an embodiment, users may synchronize swatches, palettes and "favorites" of one or more types on their mobile device to the community web site.

Users may further increase search engine ranking for a swatch or palette based on how many times it has been added to a unique user's favorite section. Thus, users, businesses and/or automated systems are provided ways to leverage the web service to control color on their own websites or web services.

Moreover, users and/or businesses may be provided ways to assign labels to specially defined 'power palettes' that control color on their own web sites, for individual users of their own services and to provide a link back to their web site so users can understand how power palettes effect color on the website.

Products and Services:

Pay Per Click and Pay Per Tap Advertising: A service that allows businesses to promote their swatches, palettes, and products within the present application Community, Shop Buy Color Community and Ad Networks where by the business pays for every click or tap through.

Affiliate Program: A service that allows businesses and the present application to promote the businesses' swatches, palettes, and products within the present application Community, Shop Buy Color Community and Ad Extension Networks where by the business pays a provider of the present application a percentage for every sale that a users makes the comes through the present application.

Other products/services provided herein include the following: Premium Palettes: A service where a business can promote one or more brands within a "community section" whereby the business pays, for example, a yearly fee for 1 of 5 market segment based spots;

Featured Palettes: A service where business can promote their swatches, palettes, and products within the "Feature Palette" section whereby the business pays, for example, a monthly fee for 1 of 25 spots;

Color Search Enablement: A service that allows business to have a application on its website, whereby the business pays, for example, a monthly service fee for use of the service;

Color Market Analysis and Trending services: A services where business can buy trending data such as color, likes dislikes by gender, demographic, and so on where by the business pays a service or per report fee; and Mobile Publish Clients: Mobile application(s) that allow users to publish to the present application API where by the purchase the App from platform service provider.

In an embodiment, business logic determines the search order results, which are based on the users' search criteria and the following: Pay for Click or Pay for Tap; Featured Palettes; Affiliate Program Member Palettes; Premium Designers; Designers; General Users and Crawled in Ranked Ordered.

The present application further includes ranking based on a formula within the business logic that is meant to encourage businesses to link back to their respective palettes and to utilize various advertising services. This allows businesses to rank high in search engine results.

Referring now to the drawing figures, in which like reference numerals represent like elements, FIG. 1 illustrates an example hardware arrangement in accordance with an embodiment of the present application. Referred to generally, herein, as system 100, the arrangement provides for monitoring and notification services in accordance with the teachings herein. System 100 includes at least one information processor 102 (configured to operate as an Internet web server and/or database file server) that is programmed and configured to access communication network 106 and communicate with computing device(s) 104. Computing devices 104 may be personal computers, and may further be mobile devices, such as operating one or more of the GOOGLE ANDROID, APPLE IOS, WINDOWS MOBILE operating systems, and may include smartphone devices, tablet computing devices, other mobile portable devices. Computing devices 104 and information processor(s) 102 may communicate via the known communications protocol, Transmission Control Protocol/Internet Protocol "TCP/IP." Information processor 102 and computing device(s) 104 preferably are provided with or have access to all databases necessary to support the present application.

Communication network 106 is preferably a global public communication network such as the Internet, but can also be a wide area network (WAN), local area network (LAN), an intranet or other network that enables computing devices and peripheral devices to communicate.

In a preferred embodiment, information processor(s) 102 and computing devices 104 are preferably equipped with web browser software, such as MICROSOFT INTERNET EXPLORER, MOZILLA FIREFOX, APPLE SAFARI or the like. Information processor 102 and computing devices 104 are coupled to communication network 106 using any known data communication networking technology.

Figure 2:
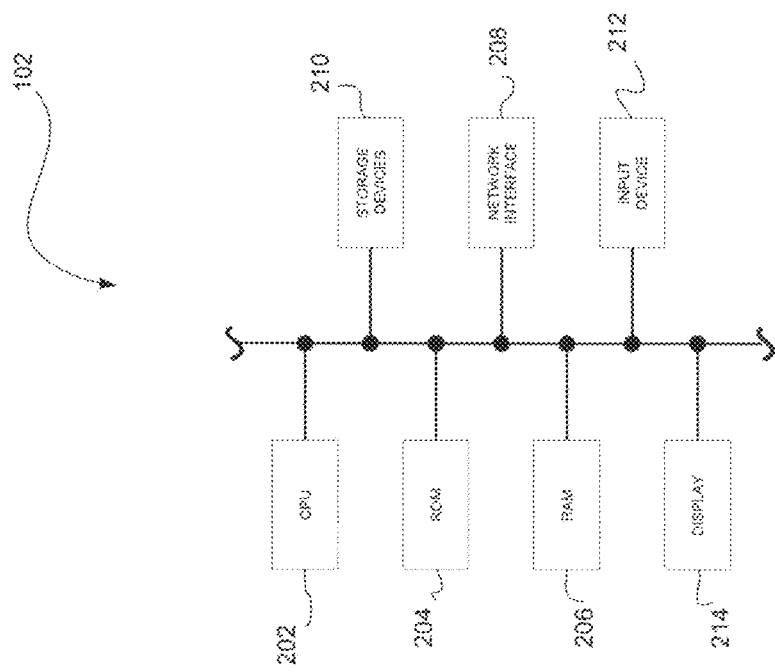
FIG. 2 illustrates functional elements, of which one or more may be configured in an computing device in accordance with an embodiment.

FIG. 2 illustrates functional elements, of which one or more may be configured in an example information processor 102 and/or computing device 104. The functional elements shown in FIG. 2 include one or more central processing units (CPU) 202 used to execute software code and control operations. Other elements shown in FIG. 2 include read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code databases and application data, one or more input devices 212 such as a keyboard, mouse, track ball, microphone and the like, and a display 214.

The various components illustrated in FIG. 2 need not be physically contained within a single device chassis or even located in a single location. For example, storage device 210 may be located at a site that is remote from the remaining elements of information processor 102, and may even be connected to CPU 202 across communication network 106 via network interface 208. Information processor 102 and/or computing device 104 may include a memory equipped with sufficient storage, such as to provide or access the necessary databases, forums, and other community services communicating hypertext markup language (HTML), Java applets, Active-X control programs. Information processor 102 and/or computing device 104 are arranged with components, for example, those shown in FIG. 2, suitable for the expected operating environment. The CPU(s) 202, network interface(s) 208 and memory and storage devices are selected to ensure that capacities are arranged to accommodate expected demand.

The nature of the present application is such that one skilled in the art of writing computer executable code (i.e., software) can implement the functions described herein using one or more of a combination of popular computer programming languages and developing environments including, but not limited to, C, C++, Visual Basic, JAVA, HTML, XML, ACTIVE SERVER PAGES, JAVA server pages, servlets, MYSQL and PHP.

Although the present application is described by way of example herein and in terms of a web-based system using web browsers and a web site server (e.g., information processor 102), system 100 is not limited to such a configuration. It is contemplated that system 100 is arranged such that information processor 102 and/or computing devices 104 communicate with and outputs data using any known communication method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on information processor 102 and/or computing device 104, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, WINDOWS VISTA, WINDOWS 7, MAC OS, UNIX, LINUX, PALM OS, POCKET PC, BLACKBERRY, ANDROID, IOS and any other suitable operating system.

FIG. 3A is a block diagram illustrating flow of information and interactivity between various Internet-related resources and processes associated with information processor 102. As illustrated in FIG. 3A, information processor 102 is configured with logic (illustrated as "swatchmatch logic"), which includes instructions that, when executed by information processor 102, cause receive information from various sources, to process the information, and to transmit information to various devices. For example, crawler/bulk publisher 304 collects information associated with images, including for products, located on the Internet. In addition to crawler/bulk publisher 304, color/product information is received from user-run applications, such as mobile applications 306 which may be suitable software applications that operate on mobile computing devices, such as an IPHONE, IPOD TOUCH, or other mobile device, such as that operates the BLACK-BERRY operating system, ANDROID operating system, PALM PRE operating system, NEXUS ONE operating system, or the like.

In an embodiment, a version of a client software application may be provided that supports less functionality for users. Referred to herein, generally, as a "lite" version (illustrated as SWATCHMATCH LT IPHONE APP 307), read-only functionality is provided that enables users to read content (e.g., colors, information over the Internets, but not to publish content (e.g., colors, swatches and/or palettes) to the web service. In an embodiment, SWATCHMATCH LT IPHONE APP 307 is provided for free to the user.

In addition to publisher 304 and applications 306, users may provide color/product information to information processor 102 via Internet web site 308 (illustrated as SWATCH-MATCH.COM). Internet web site 308 is preferably configured to receive from a user, color information that is usable for indexing and generation of swatches and/or palettes. For example, users select images that may be available on the Internet or local storage device(s) that are accessible to the users (e.g., flash drives and/or hard drives), and, thereafter, to identify one or more colors in the image(s) and/or dynamic color name database ("DCNDB"). In an embodiment, the DCNDB includes one or more tables in a database schema and provides color names or color name suggestions based on the popularity of a color name for a certain numerical representation for color. For example, swatches with the hex color ffffff will have the name White assigned for that color. In an embodiment, information processor transmits via Internet web page 308 information to mashups 310 for disseminating color/product information conveniently and quickly.

In the example block diagram shown in FIG. 3A, information is transmitted from information processor 102 to one or more social networking software application(s) 312 (illustrated as "SWATCHMATCH FACEBOOK APP") and RSS Readers 314. Applications 312, 314 maintain information that is current by receiving updated content from information processor 102 regularly and in response to information received, for example, from crawler/bulk publisher 304, mobile app 306 and web site 308. In addition to web site 308, affiliate marketing web site 316 (illustrated as "SHOPBUY-COLOR.COM") receives color/product information from information processor 102. Palettes are published from web site 316 and accessible via web site 308 (step 318). Users access web site 308 to locate and/or purchase products that match one or more colors.

Thus and as illustrated in FIG. 3A, information processor 102 sends/receives information to and from a plurality of resources, including mobile device applications, mashups, crawlers, social networking applications and/or web sites. This provides for a prolific and integrated network of information exchange associated with colors and products, which is supported by a combination of automatic and manual processes.

FIG. 3B is a block diagram that illustrates logic and database resources accessible to information processor 102 in accordance with an embodiment. In the example block diagram shown in FIG. 3B, information processor 102 includes or configured to access a read-only text-only site 320, and to publish RSS feed source 322. Moreover, information processor 102 is configured to access and/or apply color matching formula 324 for locating and/or identifying products that have or contain color that matches a swatch or palette selected by a user. API 326 is provided, for example, for providing access to information processor 102, including via the user interface shown and described herein. Dashboard 328 includes, for example, selectable options that are provided in particular context for respective users. For example, dashboards are provided for business owners to collect user information, manage users and content. Users and/or content may be added, deleted or modified via dashboards. In an embodiment, dashboards are provided for administrative users for use as an administrative portal, and is not made available for general or non-administrative users.

Continuing with reference to FIG. 3B, information processor 102 is configured with business logic 330, for example, for charging and/or receiving fees for parties to promote or highlight content. In an embodiment, business logic 330 associates payments made by respective to affect rankings of products listed in response to user-based searches. Business logic 330 may also be used to determine top or most popular colors, swatches and/or palettes, and to cause them to be displayed in a respectively ranked order.

In addition, information processor 102 is configured with or has access to search engine 332, which provides search-related functionality to locate products that contain or have particular color(s). In an embodiment, crawler/bulk publisher 304 populates one or more databases that contribute to content to be searched for by search engine 332.

Other functionality provided by information processor 102 and illustrated in FIG. 3B is User Account 324. User account 324 is effective for information processor 102 to maintain account information for a plurality of users, including businesses and parties offering products for sale, and providing palettes and color swatch information to information processor 102 for a user (e.g., a customer) to locate their products as a function of palettes and/or colors. In an embodiment, information processor 102 accesses or is otherwise communicatively coupled to database 336, which is illustrated as MYSQL.

Figure 4A:
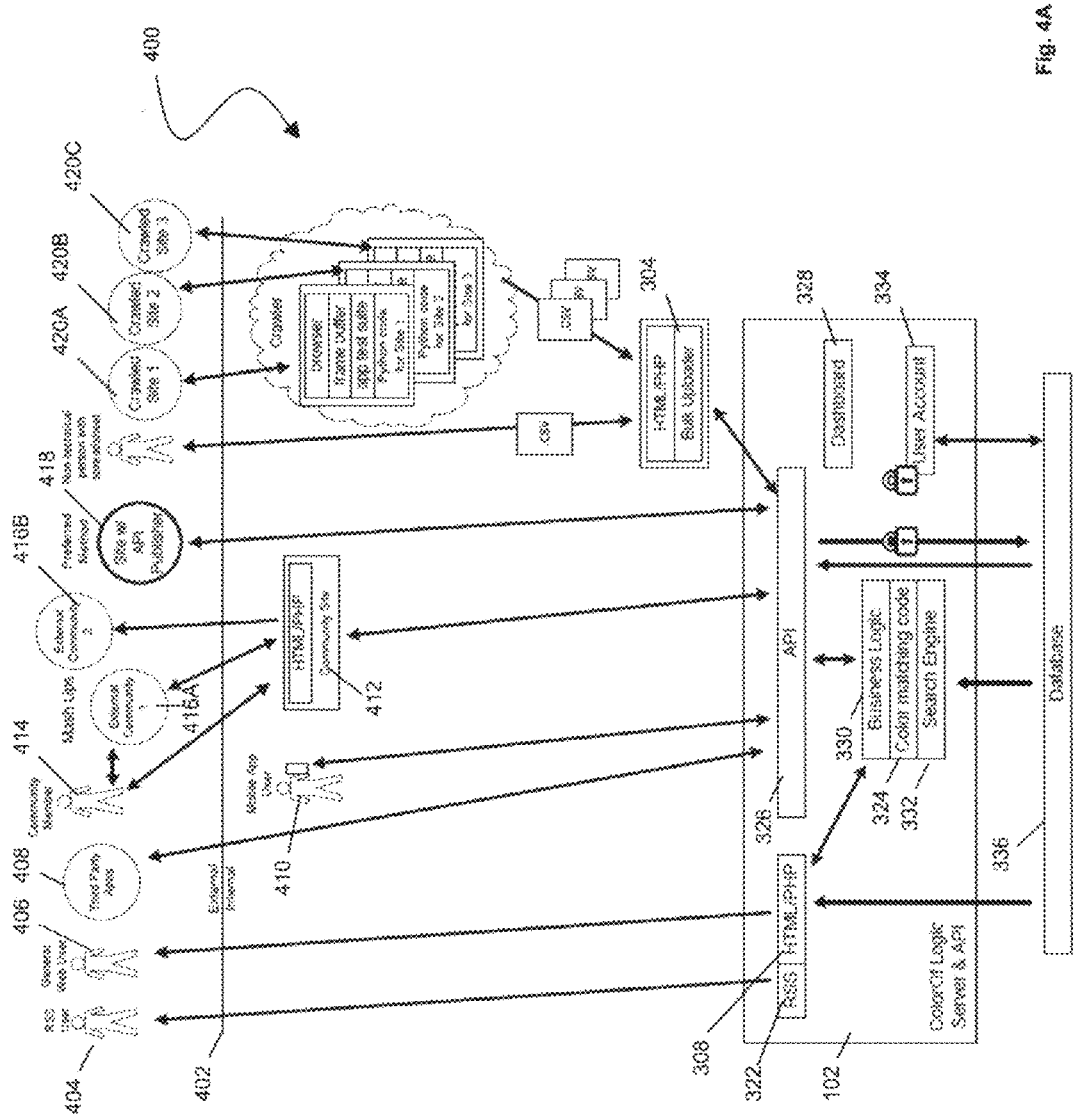
FIG. 4A is a block diagram illustrating flow of information and interactivity between various parties, Internet-related resources and processes accessible to information processor.

FIG. 4A is a block diagram illustrating flow 400 of information and interactivity between various parties, Internet-related resources and processes accessible to information processor 102. In the example shown in FIG. 4A, external/internal barrier 402 represents a demarcation between users and devices located (externally) on the Internet and devices/resources that are provided with or otherwise accessible (internally) to information processor 102. In the example shown in FIG. 4A, RSS user 404 operates a device configured, for example, with RSS reader 314 (FIG. 3A) receives RSS content from RSS feeder 322 (FIG. 3B). General web user 406, operating a device configured with standard web browsing software, receives web site content 316 (FIG. 3A) (illustrated as HTML/PHP), such as via HTTP, of which at least some may originate from database 336 (FIG. 3B). RSS 322 and web site content 316 send and/or receive information to/from business logic 330, color matching formula ("code") 324 and/or search engine 332. API 326 sends and/or receives information to/from third party application(s) 408, and/or a user 410 of mobile device application 306.

Continuing with reference to FIG. 4A, API 326 sends/receives information to/from community web site 412, which may be provided for matching and coordinating of colors, and further comprises social networking functionality and where users can make suggestions about matching colors, publish articles, contribute to a web log ("blog"), post comments, rate colors and color combinations, publish their swatch and palettes, and/or mash up their content with other web services. As illustrated in FIG. 4A, community web site 412 sends/receives information to/from community member 414 and external community ("mashups") 416A and 416B. For example a community member may use a social network web site to send a message that a new swatch has been posted, which would notify others. Alternatively, a proprietor of the present application may post a message regarding new posts, new designers or the like.

Also illustrated in FIG. 4A, API 326 sends/receives information to/from Internet web site 308, which is shown as being configured with API publisher. Internet web site 308 is usable to receive from a user, color information that is usable for indexing and generation of swatches and/or palettes. An example Internet web site 308, including API publisher is shown and described below, with reference to FIGS. 5-13.

In addition to receiving color swatch and palette information from a user via Internet web site 308, crawler/bulk publisher 304 is illustrated in FIG. 4A and shown to be configured to send and receive information to/from API 326. In one embodiment, non-technical person 418 enters information, for example, in a spreadsheet application and transmits a file, such as a comma separated file ("CSV") or other form of delimited ASCII text file to be received by bulk uploader 304, and used to securely populate database 336. In the example shown in FIG. 4A, database 336 is illustrated as securely receiving information from API 326 with a lock. Database 336 may also be populated via crawler 304, which locates color and/or product information from crawled sites 420A, 420B and 420C. In the example shown in FIG. 4A, python code is provided for each respective site 420A, 420B and 420C, with use of an OS instance with a headless frame buffer and application test suite the python code crawls the site looking for interesting content and then drives the application test suite to gather that interesting content so as to publish to csv format. csv files are then scrubbed and automatically uploaded to the web service via the bulk uploader. Also illustrated in FIG. 4A and in connection with features provided by or otherwise available to information processor 102 are dashboard 328 and user account 334 (FIG. 3). User account 334 information is securely stored in database 336, and is access thereto is restricted to authorized users.

Figure 4B:
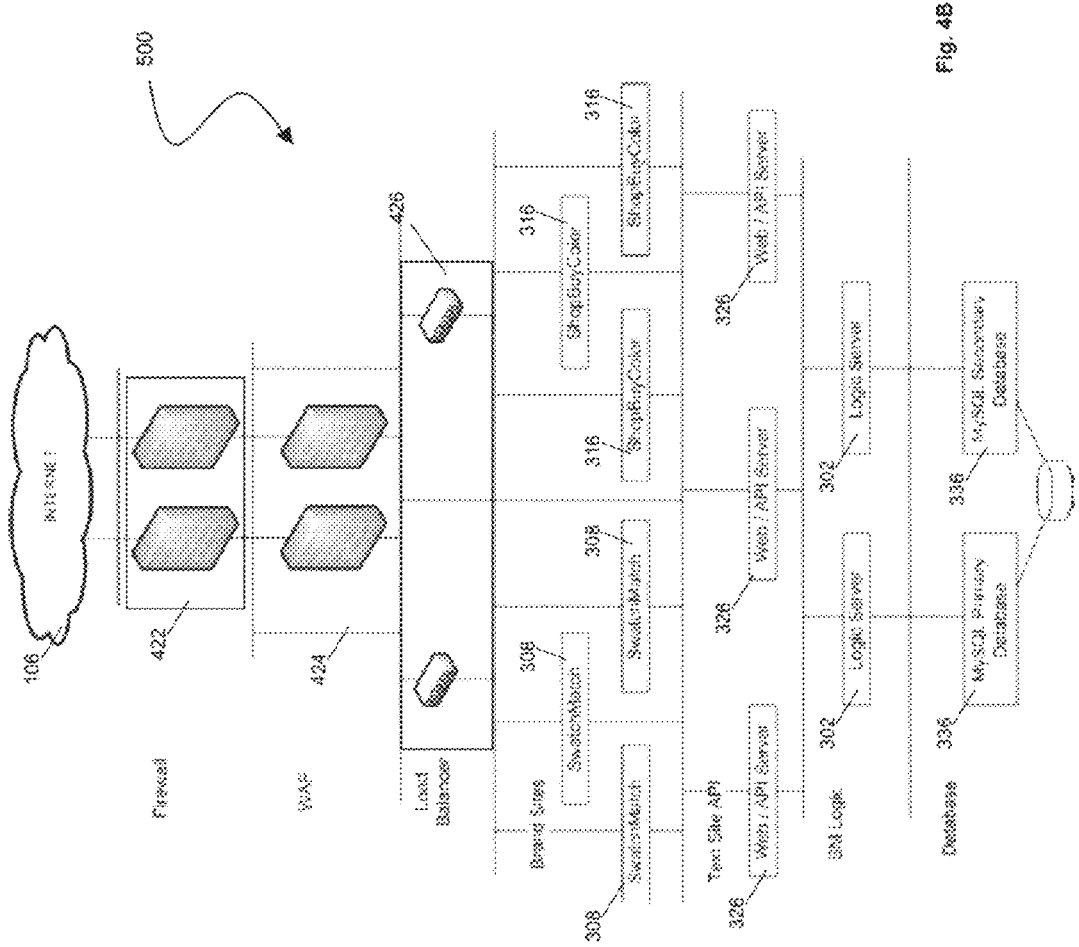
FIG. 4B is a block diagram illustrating a layout of devices and resources in accordance with an embodiment.

FIG. 4B is a block diagram illustrating a layout of devices and resources in accordance with an embodiment. At the top of FIG. 4B is communication network 106, which in the embodiment shown in FIG. 4B is the Internet. Below that are firewalls 422 and web application firewalls ("WAF") 424, which prevent unauthorized access to information and resources associated with information processor 102. In order to optimize performance, load balancer(s) 426 are provided on the inside of firewalls 422 and WAF 504. In addition, affiliate marketing websites 316 (e.g., "ShopBuyColor.com") are illustrated for businesses, wherein a portion of revenue generated through sale of each item sold via affiliate marketing website 316 is paid by a respective business. Example Internet web sites 308 are also illustrated in FIG. 4B, as well as Web/API Server 326, Swatcmatch Logic Server 302 and Database 336.

In an embodiment, an example Internet web site 308 including a web-based application is usable via standard Internet web-browsing software, and illustrated in FIGS. 5-13. FIGS. 5-13 illustrate an example web-based embodiment, including API publisher, in which a user identifies a particular swatch, palette or both and searches for corresponding items.

In FIG. 5, display screen 500 is illustrated that includes graphic controls for, among other things, selecting a color, providing search criteria (swatch, palette or both) and submitting search criteria for respective items. Using a web browser-based interface, users can search for and locate items having color(s) that the user defines. For example and as shown in FIG. 5, a user defines a color for a search by selecting grab icon 502 or color icon 504. By selecting color icon 504, a user defines a particular color, for example, by hexadecimal value. Alternatively, a user selects grab icon 504, which implements a process for selecting a color that is displayed in a particular image file. Moreover, a user selects whether to search by swatch, palette or both in criteria selection 506. Once the user identifies the particular color and criteria for searching, the user submits search text in text box control 508 that is descriptive of the item(s) that the user wants.

FIG. 6 illustrates example display screen 600 that is provided to a user who selects grab icon 504 (FIG. 5) to identify a respective color in an image file. In the example shown in FIG. 6, image preview window 602 is blank indicating no image has been loaded. Using the options provided in display screen 600, a user can load an image from an Internet web address (URL control 604) or can select an image that is stored locally on the user's device (select image control 606).

Figure 7:
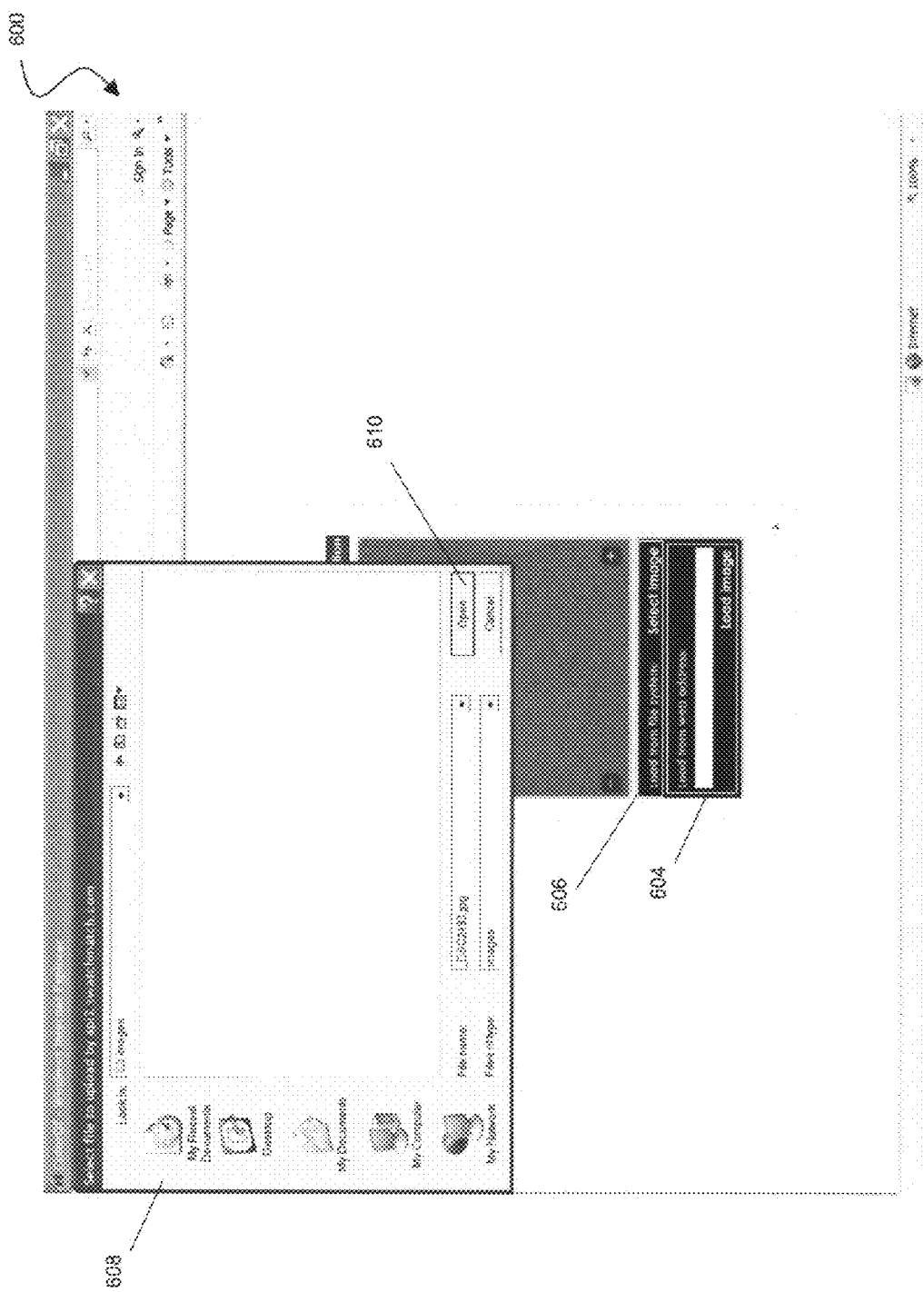

FIG. 7 illustrates example display screen 600 that includes image upload selection window 608 that is provided when a user loads an image file via control 606. As shown in FIG. 7, the user has navigated to a respective folder on his file system, images, and has selected a respective image file therein. Once the user has identified the respective file, the user selects open button 610 and the image is uploaded into image display section 602 (FIG. 8).

Figure 8:
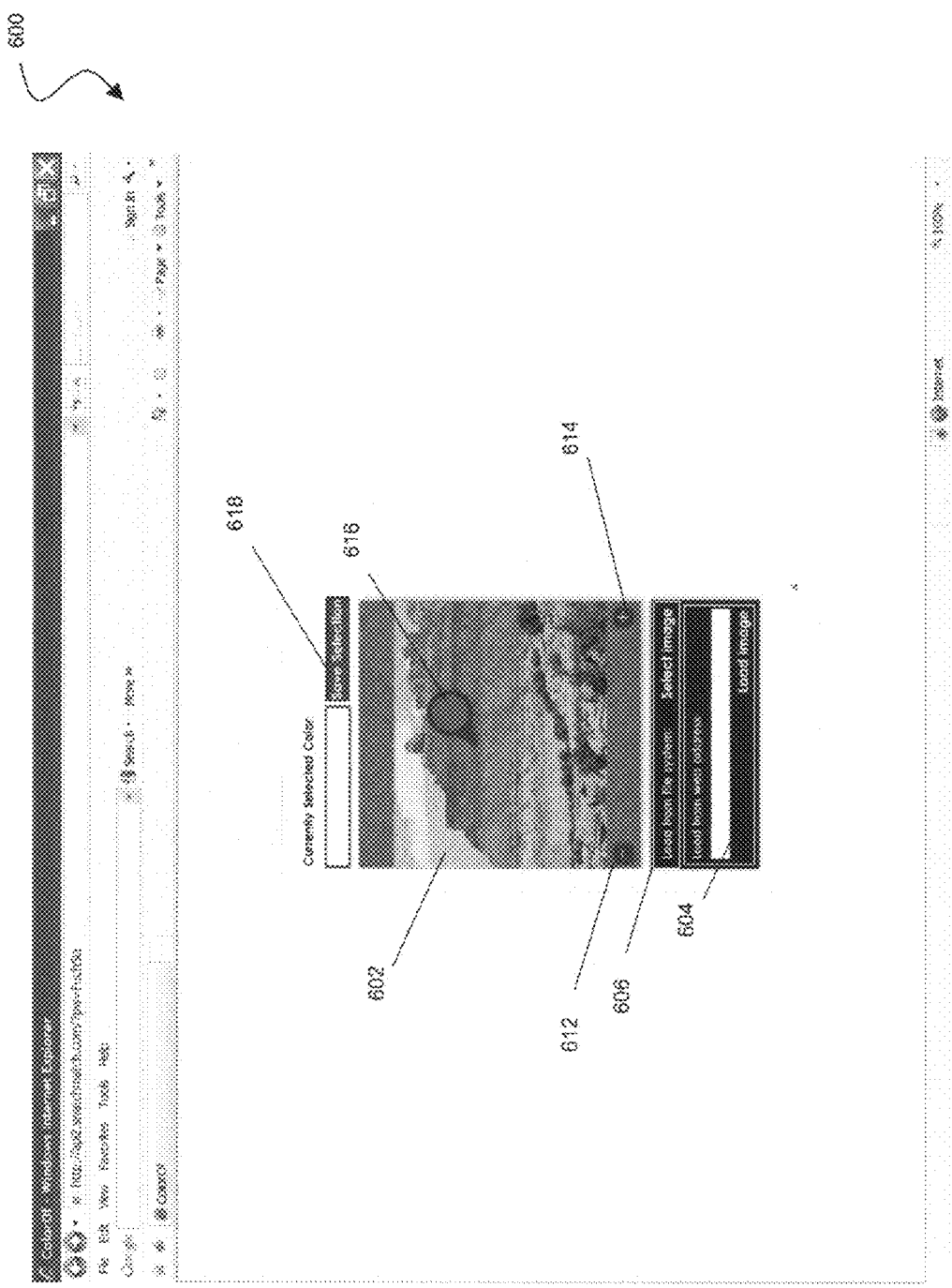

FIG. 8 is an example display screen 600 that includes color selection tool 616 that is used for identifying a particular color within an image that is loaded and displayed in image display section 602. In the example shown in FIG. 8, color selection tool 616 is shown in the shape of a magnifying glass, and by using a mouse or other pointer/selection tool, the user moves color selection tool 616 to an area in an image to select a respective color therein. A user can select minus control 612 and plus control 614 to zoom in or out of the image to improve color selection. Thereafter, the user selects a selection button 618, and the color that is highlighted in color selection tool 616 is selected and saved.

Figure 9:
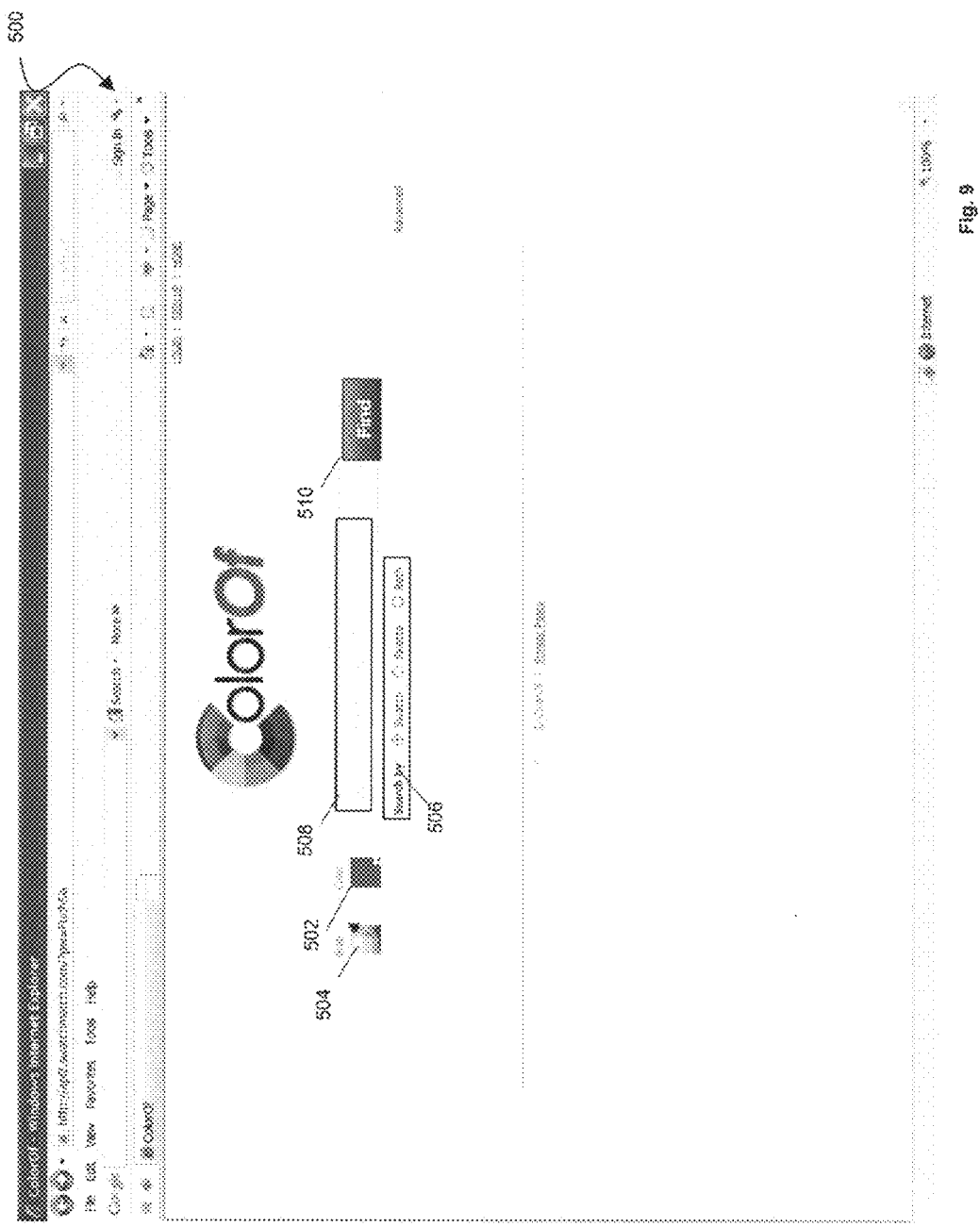

FIG. 9 illustrates an example display screen 500 after the user has selected the color in FIG. 8. In the example shown in FIG. 9, color selection 502 contains the same color that has been selected by color selection tool 616 (FIG. 8).

Figure 10:
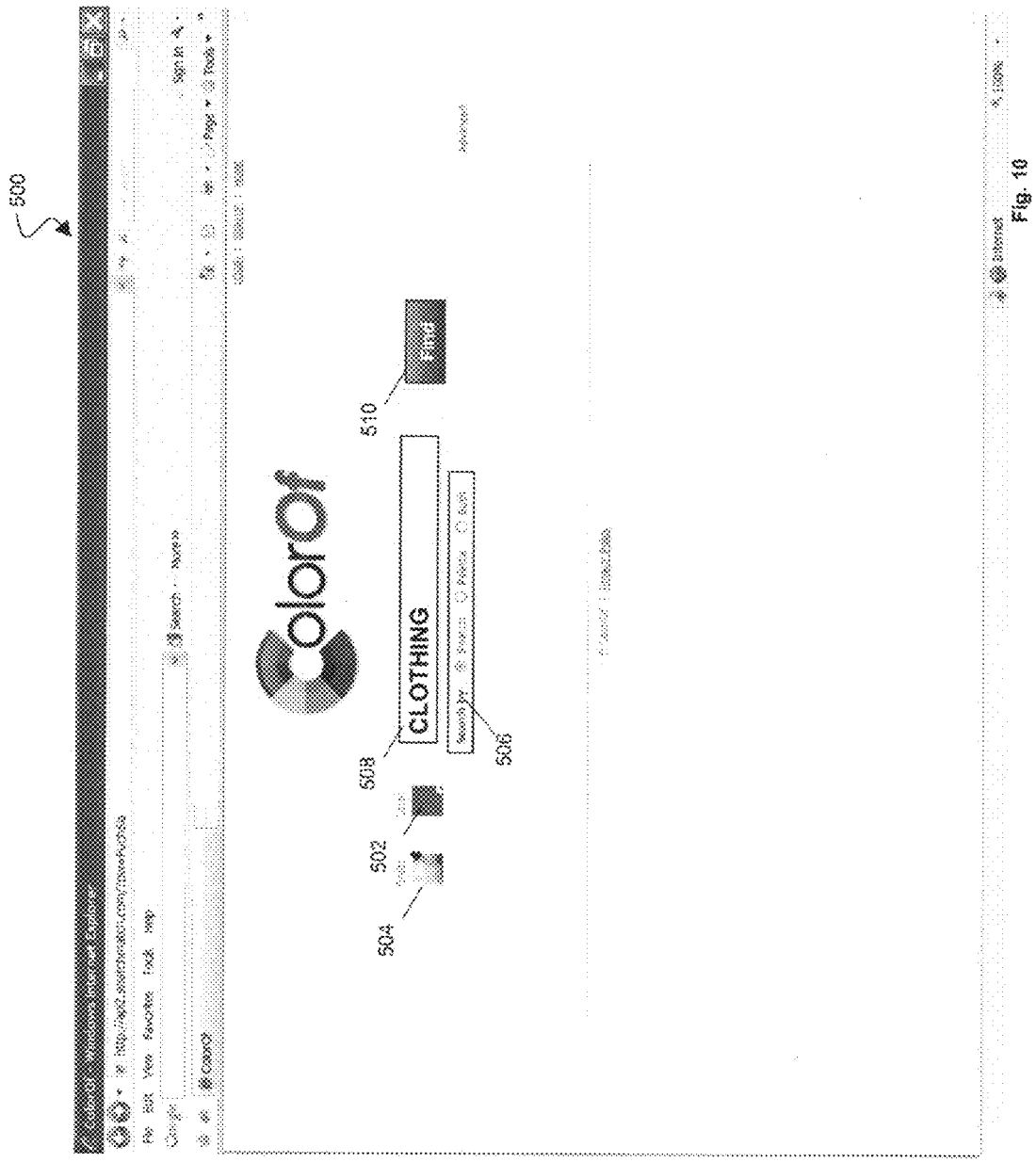

FIG. 10 illustrates a use of text box search control 508 for searching items that include the same color shown in color section 502. In the example shown in FIG. 10, the user has elected to search by swatch in a search by section 506. Moreover, the user has entered clothing in text box 508 for the item criteria. Once completed, the user selects find button 510 and all items matching the textual search criteria and the color swatch are retrieved.

Figure 11:
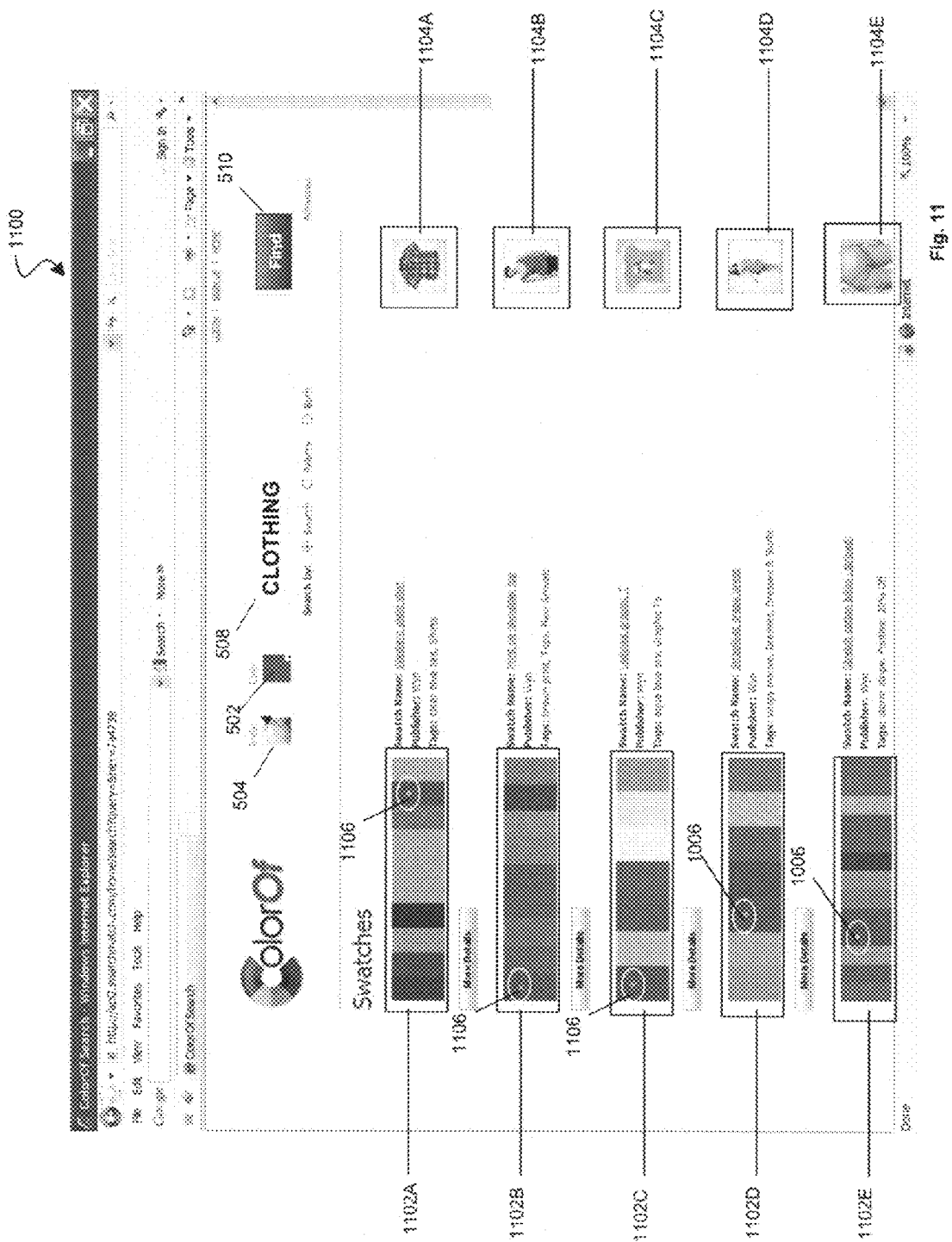

FIG. 11 illustrates an example display screen 1100 that identifies for the respective color swatch to be included in the search for clothing. As shown in FIG. 11, swatches 1102 are displayed identifying color that is represented in the respective clothing items that were retrieved in accordance with the user's search (i.e., text box control 508, find button 510). As shown in FIG. 11, swatch 652a include colors that are included in clothing item 1104a. Similarly, colors in swatch 1102b correspond to colors that are in clothing item 1104b, and so forth. Moreover, color identifier 1106 is included in each respective swatch 1102 (a-e) to identify the respective swatch that is closest to the selected color identified in color section 502. Thus, at a glance, a user can identify via swatches 1102 colors in each respective item uncovered by a search and the closest respective color to the selected swatch (and/or palette) selected by a user. As noted above, in an embodiment the closeness in color of the two numerical representations of color is displayed to the user by means of a meter (not shown). The meter may represent the closeness in color in a number of ways such as, but not limited to, an arrow that moves from left to right as user through the method described above selects a color in a photo or image. The meter may also use a color scale to represent to the user the closeness of the two colors.

Figure 12:
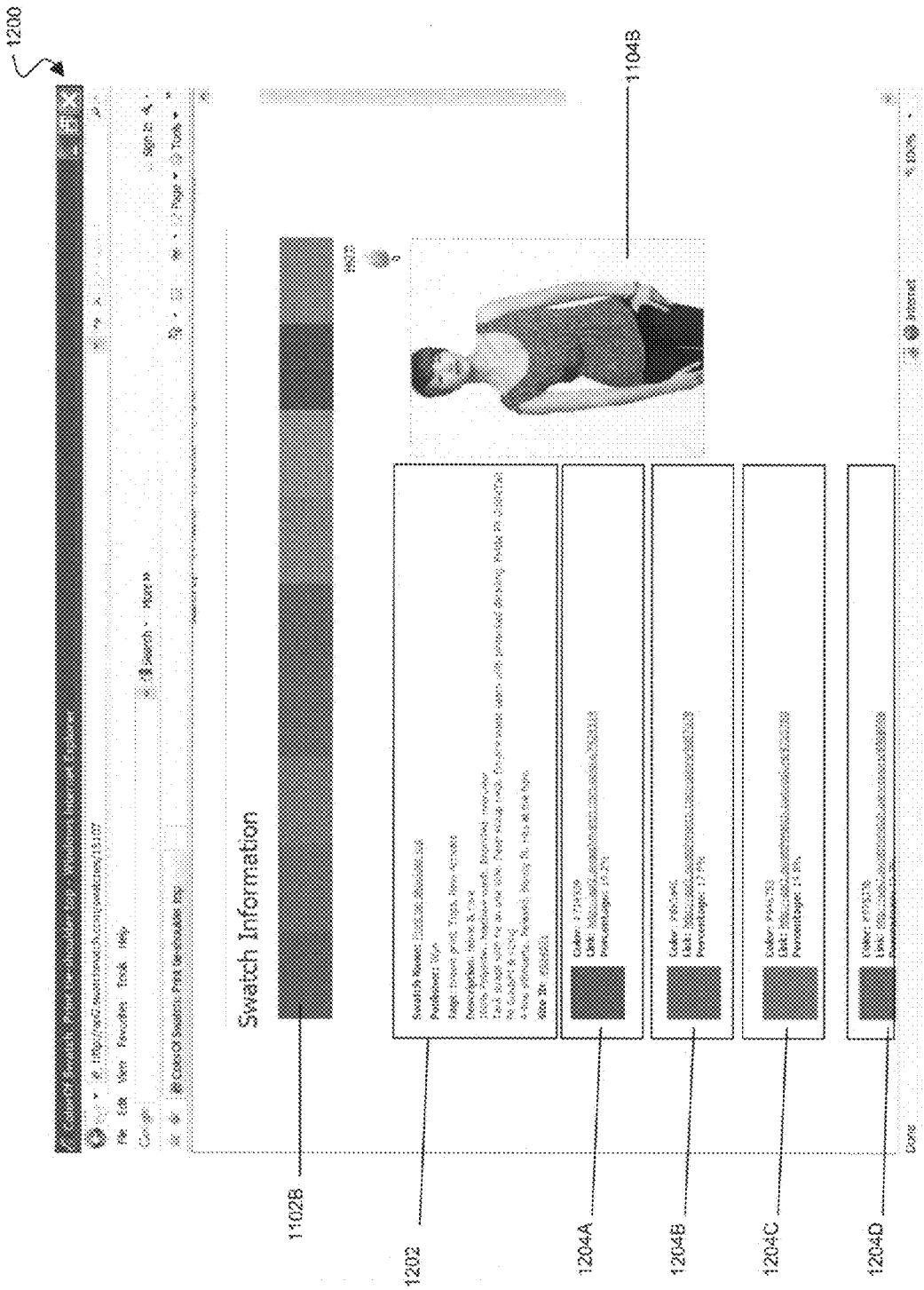

FIG. 12 illustrates an example display screen 1200 that is provided to a user who selects a respective swatch 1102 or item 1104, as well as the respective colors that are identified in that swatch. Swatch information section 1202 identifies the swatch name, publisher, metatags, description and site ID for the respective swatch and/or item identified in display screen 1200. In the example shown in FIG. 12, color section 1204*a* identifies color number 714939 that makes up 18.2% of the clothing item identified in 1104*b*. Similarly, section 1204*b*-section 1204*d* identify the respective colors in color swatch 1102*b* and their respective percentages as displayed in item 1104*b*. In an embodiment, colors 1204 are formatted as selectable hyperlinks that, when selected, result in a display of additional information for the selected color as well as items that include the selected color, substantially as shown in FIG. 13.

Figure 13:
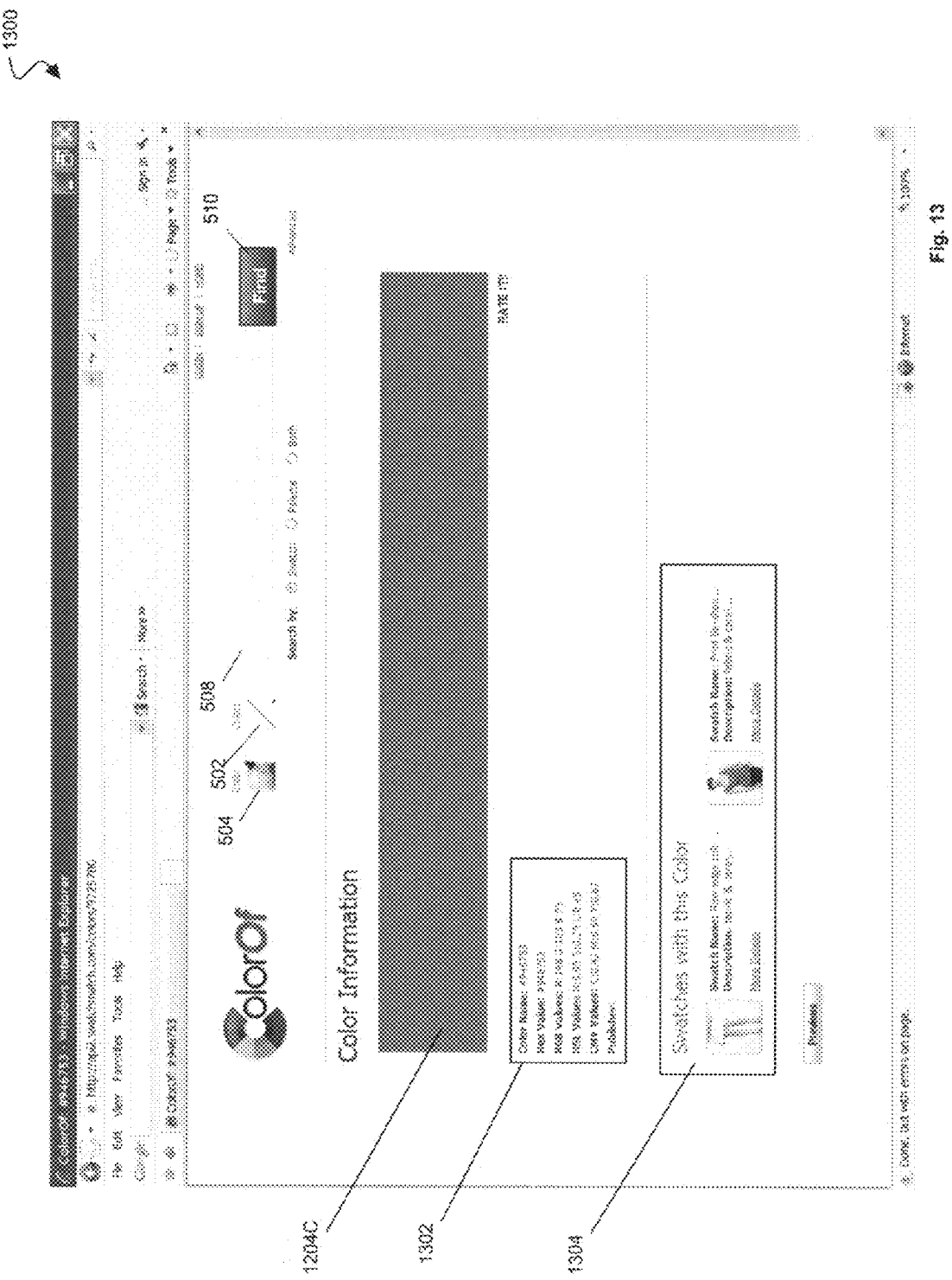

FIG. 13 illustrates an example display screen 1300 that includes color information for selected color (1204*c*) and as selected in display screen 1200. As shown in display screen 1300, color information section 1302 includes information about the selected color 1204*c*, including the color name, hexadecimal value, as well as RGB values, HSL values and CMY values. Publisher information and any other suitable information may also be provided in color information section 1302. Further, and as shown in FIG. 13, swatches with this color section 1304 identifies items and respective swatches that contain the color shown in 1204*c*. Thus, and in accordance with the embodiment shown in FIGS. 5-13, a user can identify from a plurality of sources and/or identify a respective color by name and/or numeric value, and search for and select items offered for sale that include the color.

Figure 16B:
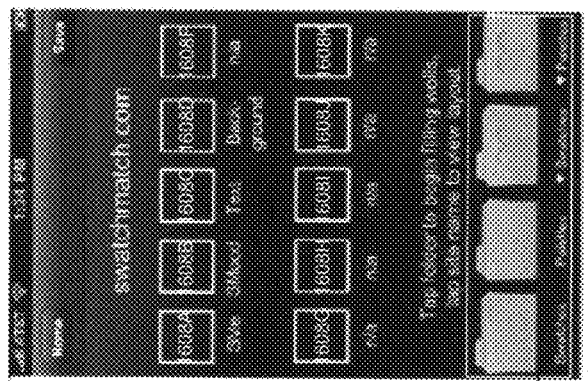

FIGS. 14-16 illustrate an example embodiment in accordance with a mobile application 306, including API publisher, in which a user identifies a particular swatch, palette or both and searches for corresponding items. FIGS. 14A-14D illustrate a series of display screens operable for a user to create a color swatch using mobile device 104. In the example shown in FIG. 14A, a user has selected an image in application 306 and uses color selection tool 616 to identify a particular color within the blouse shown in the displayed image. Color swatch bar 1402 illustrates the color selected by the user, and color tuner control 1404 enables the user to adjust the color, such as in terms of contrast, brightness, hue, warmth or the like. Once the user is satisfied with the selection shown in color swatch selection 1402, the user enters attribute information about the swatch, for example, via the graphical screen controls illustrated in FIG. 14B. For example, the user submits a name for the color via name textbox 1406 (illustrated as "coral"), a subject for the color via subject textbox 1408 (illustrated as "Melissa's Favorite Color"), and a type via type textbox 1410 (illustrated as "Blouse").

Figure 14B:
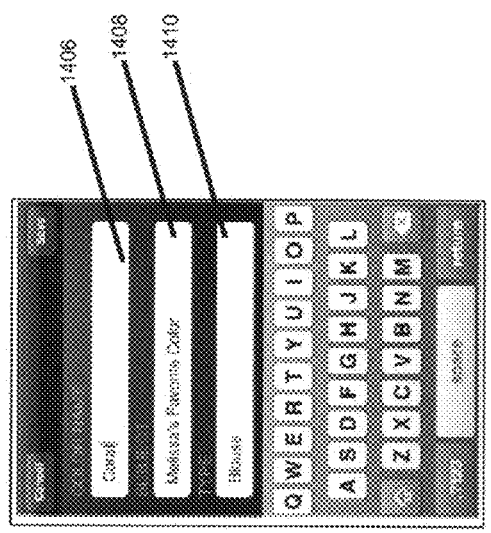
Figure 14D:
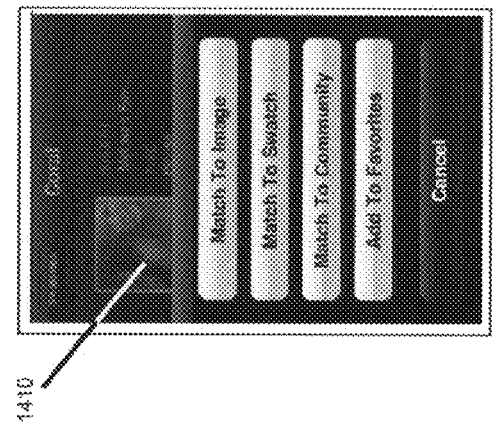
Figure 14A:
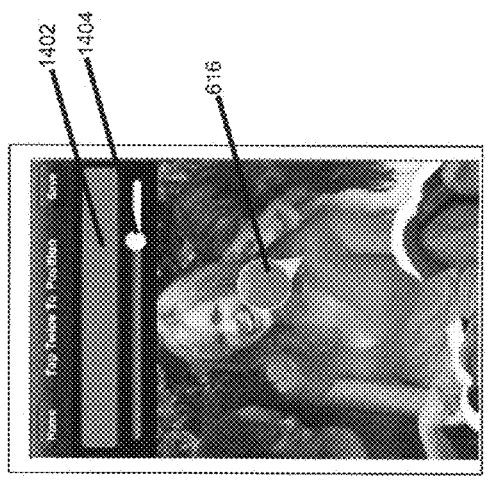
Figure 14C:
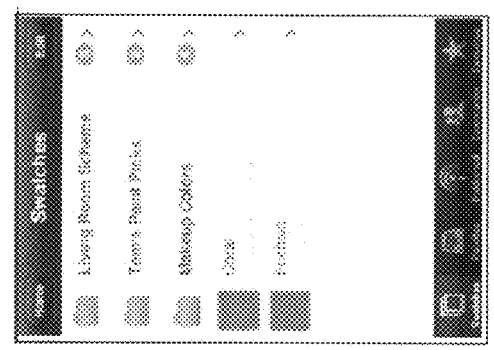

Thereafter, the swatch is saved in database(s) 336 for future use, and may be saved in one or more folders, for example in a user-defined hierarchical folder system (FIG. 14C). Once saved, the user uses mobile application 306, for example to search for products that match to the image, match to the swatch, match to community and/or add to favorites (FIG. 14D). In an embodiment, while a swatch icon is displayed in background section 1412, the user cannot operate (e.g., perform operations on the swatch, such as shown and described above, including with reference to FIGS. 14A-14C) on the swatch. In this way, swatches and corresponding information, including meta-data, may be displayed.

FIGS. 15A-15D illustrate additional functionality provided in an example mobile application 306 embodiment. In FIG. 15A, the user has selected the coral color (FIGS. 14A-14C) and a necklace product has been identified in a search. The coral color is displayed in left-hand region 1402A of color bar 1402, and the necklace's color is displayed in the right-hand region 1402B of color bar 1402. The colors respectively shown in 1402A and 1402B are nearly identical, which is indicated by color matching meter 1502, which shows the indicator nearly at the rightmost position in the scale.

FIGS. 15B-15D illustrate example mobile platform screen displays for defining a palette of respective colors. In FIG. 15B, the user navigates through folders to create a palette from swatches that have been saved previously. In the example shown in FIG. 15B, palette 1504 is displayed and contains three colors. Folders 1506 are provided for the user to navigate through and select swatches for adding to palette 1504. In the example shown in FIG. 15B, folders 1506 include folders for swatches, palettes, "favorite" swatches and "favorite palettes." FIG. 15C illustrates the three colors contained in palette 1504, each provided with a respective "X" button 1508 for removing color(s) from the palette. When the user is satisfied with the colors included in palette 1504, the user selects Save button 1510. FIG. 15D illustrates example graphical data entry controls for submitting palette attributes in accordance with the example mobile application 306. In the example shown in FIG. 15D, the user enters a link (formatted as a uniform resource locator ("URL") where another user can find information about palette 1504. Additionally, public and/or private comments may be submitted for attribute information to be associated with palette 1504.

Figure 16A:
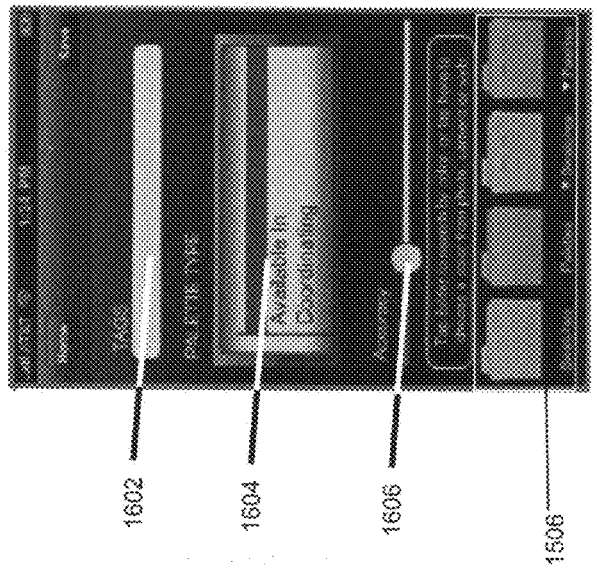

FIG. 16A illustrates an example mobile application 306 that enables users to search the community for palettes. Users may search for palettes based on attributes information (e.g., tags), palette type, and/or a respective swatch color. For example, a user may submit information in tag data entry control 1602 and palette type control 1604 for selective searching. Moreover, accuracy slider control 1606 is provided for a user to adjust the accuracy of the color match. Slider control 1606 is useful for users who have varying requirements for accuracy between a selected color and a colored product.

In an embodiment, palettes having a greater degree may be provided. As noted above, "power palettes" may be provided that control color on respective Internet web sites 308. In the example shown in FIG. 16B, users assign, via API 326, swatches to respective features in a web site, such as background, text color, links, or the like, by selecting a respective well 1608A-1608K. For example, the user selects the coral color (FIG. 14A) for well 1608C (associated with web site text) and, thereafter, text that is provided on the respective web site 308 is displayed in the coral color. This provides for significant and convenient control over the appearance of web site content.

Figure 17A:
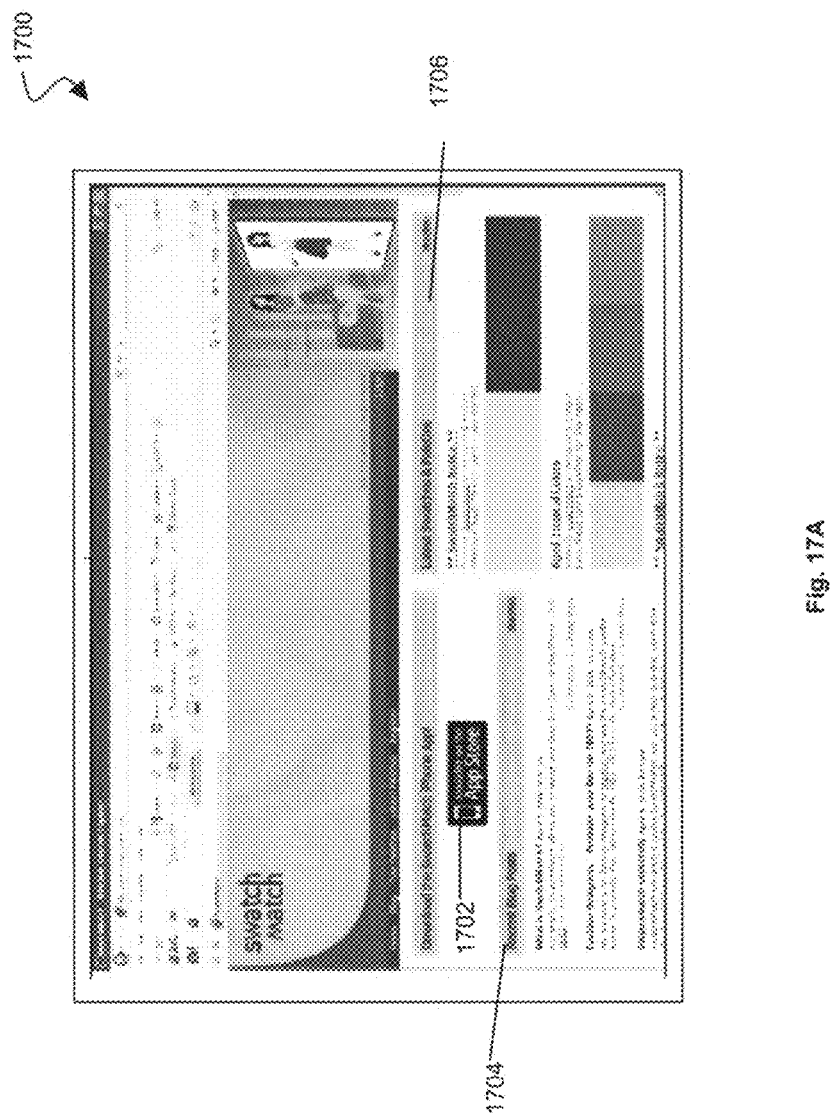
FIGS. 17A and 17B illustrate an example display screen, which includes functionality associated with an example community web site in accordance with an embodiment.
Figure 17B:
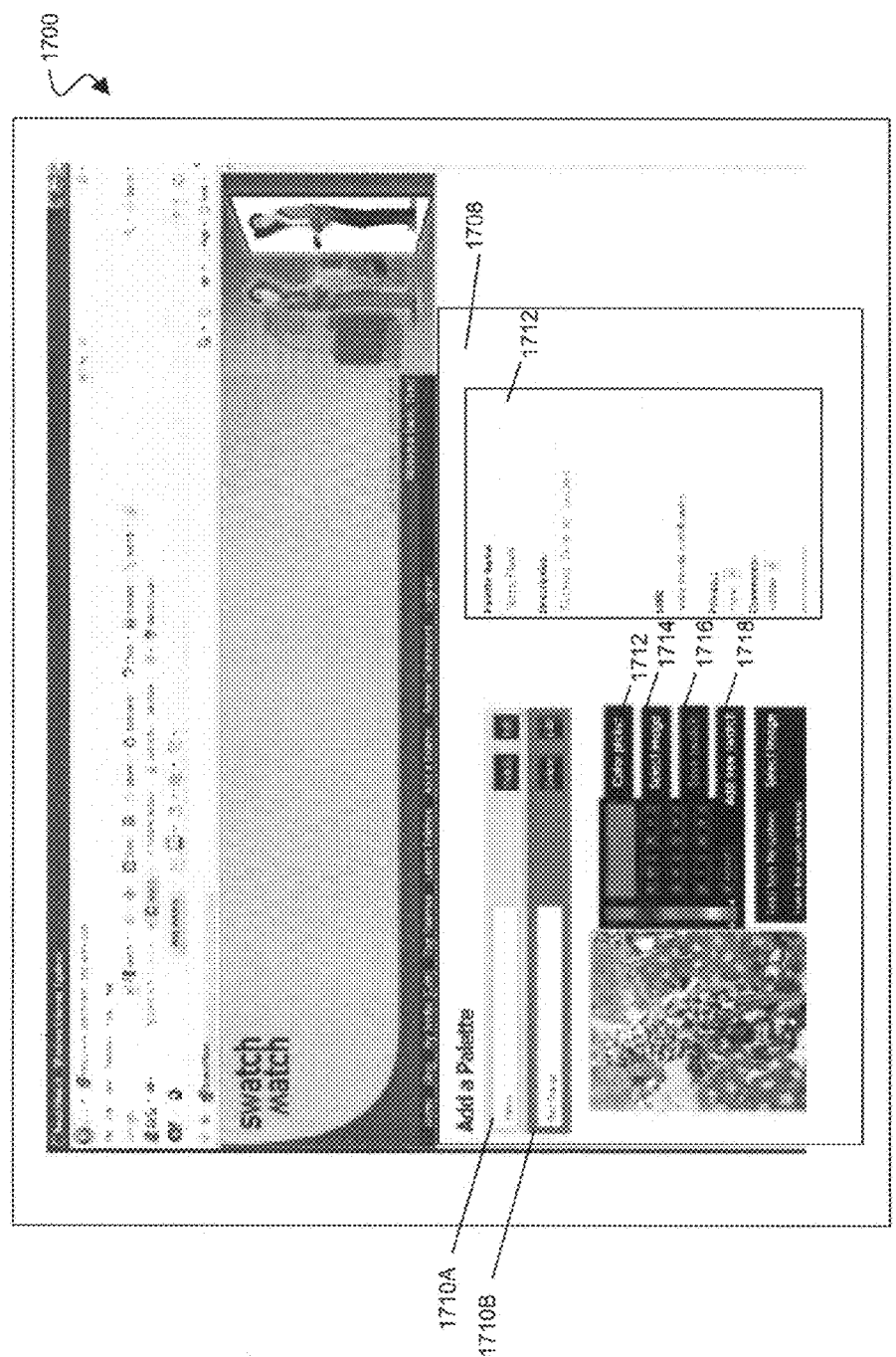

FIGS. 17A and 17B illustrate display screen 1700, which includes functionality associated with an example community web site 412 in accordance with an embodiment. As shown in FIG. 17A, link 1702 is provided for downloading mobile application 306 is provided. Blog posts section 1704 include recent entries and comments from users of community web site 412. Latest swatches and palettes section 1706 are provided for users to review and/or use, for example, in connection with searching for various products. Add a palette section 1708 (FIG. 17B) is useful for creating palettes on community web site 412, for use by others. Either of selected swatches 1710A and 1710B (displayed as yellow and red, respectively) may be edited or deleted. For example, color picker 1712 indicates that another shade of red is selected, and is editable, for example, via RGB, HSB or hexadecimal numeric values. Moreover, a slider graphical screen control may be provided for the user to graphically edit the selected color swatch. The user may access color information via color picker 1712 and/or select an image 1714, substantially as described above in connection with FIGS. 5-9. In addition, the user may save the swatch via control 1716, or add a new swatch via control 1718.

Thus, and as shown and described herein, a system and method are disclosed for providing color matching or coordinating for items being the same or containing the same color as set forth in a user-specified color or user-specified item. In an embodiment, the user uses one or more software applications to capture and store one or more numerical representations of color on a computer, smart phone or other mobile computing device, or on a server accessible over the Internet, and that matches the color on the same device or on a community website. Preferably, a networked community is provided and available via one or more web services. Users and/or automated systems conduct searches for items that match one or more particular colors that may be captured or otherwise identified. The color(s) may be matched exactly or may be within a user specified range. Moreover, users can search for colors that the networked community determines are well coordinated with, or are complementary to a respective color.

Although the present application is described and shown in relation to particular embodiments thereof, many other variations and modifications and other uses will become apparent to those skilled in the art. Thus, various embodiments and variations are shown and described herein, and it is preferred, therefore, that the present application be limited not by the specific disclosure herein.

What is claimed is:

1. A method, comprising:
   storing, on one or more processor readable media that are operatively coupled to one or more processors, at least one database comprising:
      electronic color information representing a plurality of colors;
      electronic item information representing a plurality of items, wherein each of the plurality of items respectively contain at least one of the plurality of colors;
      electronic user information representing a plurality of users; and
      electronic swatch information representing color attributes respectively associated with at least one of the plurality of colors;
   receiving, via one or more communication devices that are operatively connected to the one or more processors, a first image from a first user computing device associated with a first user of the plurality of users, wherein the first image includes a plurality of colors;
   receiving, via the one or more communication devices, first electronic color information, wherein the first electronic color information represents a first color of the plurality of colors;
   determining, by the one or more processors, first electronic swatch information of the electronic swatch information that is respectively associated with the first color;
   receiving, via the one or more communication devices, a search from the first user computing device for one or more items that contain at least one color that is at least associated with the first color;
   determining, by the one or more processors, at least one of the plurality of items that respectively contain the at least one color that is at least associated with the first color; and
   displaying, by the one or more processors, the at least one of the plurality of items and the first color.

2. The method of claim 1, further comprising providing, by the one or more processors, an interface for the first user to select, via the first user computing device, the first color from the image.

3. The method of claim 1, further comprising:
   determining, by the one or more processors, the at least one color that is at least associated with the first color by calculating representations of a plurality of colors within a predetermined range; and
   locating in the at least one database at least one selected from a group consisting of a swatch and palette having a color within the predetermined range.

4. The method of claim 3, wherein the swatch represents a color or collection of colors from a single source.

5. The method of claim 3, wherein the palette represents a collection of colors that are provided from different sources.

6. The method of claim 1, wherein the at least one color that is at least associated with the first color is determined based at least on a user-defined range.

7. The method of claim 6, further comprising receiving, by the one or more processors, palette attributes from a different color palette and applying the palette attributes to the color palette.

8. The method of claim 6, further comprising receiving, by the one or more processors, at least one comment associated with the color palette.

9. The method of claim 1, further comprising providing, by the one or more processors, a community web site that includes an interface for users to upload electronic color swatches, for advertisers to upload item information, and for users to send and receive messages to each other.

10. The method of claim 1, further comprising providing, by the one or more processors, an interface for at least one user to define a color palette, wherein the color palette includes a plurality of colors and attributes.

11. The method of claim 10, further comprising storing in the at least one database web site electronic item information representing the items containing the one or more colors.

12. The method of claim 11, wherein the API is accessible to authorized users.

13. The method of claim 12, wherein the fee is based at least in part on a ranked order of the at least one of the plurality of items in a list.

14. The method of claim 1, further comprising searching, by the one or more processors, at least one Internet web page for items containing one or more colors.

15. The method of claim 1, wherein the at least one of the plurality of items is a plurality of items, and further comprising displaying, by the one or more processors, the plurality of items according to a predetermined rank.

16. The method of claim 1, further comprising providing, by the one or more processors to the first user computing device, a recommendation for a color that is complementary to the first color.

17. The method of claim 1, further comprising providing, by the one or more processors, an application program interface ("API").

18. The method of claim 1, further comprising receiving, by the one or more processors from the first user computing device, descriptive information associated with the first color.

19. The method of claim 1, further comprising charging a fee to advertisers for displaying the at least one of the plurality of items.

20. The method of claim 1, further comprising adjusting the displaying of the at least one of the plurality of items to represent a lighting condition.

21. The method of claim 1, wherein the swatch represents a color or collection of colors from a single source.

22. A system, comprising:
one or more processor readable media;
one or more processors that are operatively coupled to the one or more processor readable media;
at least one database stored one or more processor readable media, the at least one database comprising:
electronic color information representing a plurality of colors;
electronic item information representing a plurality of items, wherein each of the plurality of items respectively contain at least one of the plurality of colors;
electronic user information representing a plurality of users; and
electronic swatch information representing color attributes respectively associated with at least one of the plurality of colors;
the one or more processor readable media having instructions for causing the one or more processors to:
receive, via one or more communication devices that are operatively connected to the one or more processors, a first image from a first user computing device associated with a first user of the plurality of users, wherein the first image includes a plurality of colors;
receive, via the one or more communication devices, first electronic color information, wherein the first electronic color information represents a first color of the plurality of colors;
determine first electronic swatch information of the electronic swatch information that is respectively associated with the first color;
receive, via the one or more communication devices, a search from the first user computing device for one or more items that contain at least one color that is at least associated with the first color;
determine at least one of the plurality of items that respectively contain the at least one color that is at least associated with the first color; and
display the at least one of the plurality of items and the first color.

23. The system of claim 22, wherein the one or more processor readable media have instructions for causing the one or more processors further to provide an interface for the first user to select, via the first user computing device, the first color from the image.

24. The system of claim 22, wherein the one or more processor readable media have instructions for causing the one or more processors further to:
determine the at least one color that is at least associated with the first color by calculating representations of a plurality of colors within a predetermined range; and
locate in the at least one database at least one selected from a group consisting of a swatch and palette having a color within the predetermined range.

* * * * *